(12) United States Patent
Wang et al.

(10) Patent No.: US 12,619,234 B2
(45) Date of Patent: May 5, 2026

(54) ROBOT CONTROL METHOD AND APPARATUS, ROBOT AND COMPUTER-READABLE STORAGE MEDIUM

(71) Applicant: Tencent Technology (Shenzhen) Company Limited, Shenzhen (CN)

(72) Inventors: Shuai Wang, Shenzhen (CN); Jingfan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 263 days.

(21) Appl. No.: 18/199,681

(22) Filed: May 19, 2023

(65) Prior Publication Data

US 2023/0288931 A1 Sep. 14, 2023

Related U.S. Application Data

(63) Continuation of application No. PCT/CN2022/135432, filed on Nov. 30, 2022.

(30) Foreign Application Priority Data

Mar. 1, 2022 (CN) .......................... 202210195625.2

(51) Int. Cl.
*G05D 1/00* (2024.01)
*B25J 5/00* (2006.01)

(52) U.S. Cl.
CPC .............. *G05D 1/021* (2013.01); *B25J 5/007* (2013.01)

(58) Field of Classification Search
None
See application file for complete search history.

(56) References Cited

U.S. PATENT DOCUMENTS

| | | | |
|---|---|---|---|
| 2016/0280307 A1* | 9/2016 | Takenaka | B60L 15/20 |
| 2019/0295179 A1* | 9/2019 | Shalev-Shwartz | |
| | | | G01C 21/3602 |
| 2020/0306998 A1* | 10/2020 | Talebi | B25J 9/1638 |

FOREIGN PATENT DOCUMENTS

| | | |
|---|---|---|
| CN | 110764413 A | 2/2020 |
| CN | 111142523 A | 5/2020 |

(Continued)

OTHER PUBLICATIONS

International Search Report and Written Opinion received for PCT Patent Application No. PCT/CN2022/135432, mailed on Feb. 16, 2023 with English translation, 10 pages.

(Continued)

*Primary Examiner* — Hongye Liang
(74) *Attorney, Agent, or Firm* — ARENTFOX SCHIFF LLP

(57) ABSTRACT

In a method of controlling a robot, first control information for controlling rotation of a driving wheel of a wheel-legged part of the robot is adaptively determined based on motion information of the robot that is generated while the robot is in motion. Second control information for controlling a plurality of joints of the wheel-legged part of the robot is determined based on the first control information, the plurality of joints being controlled based on the second control information to balance the robot. Third control information for controlling the plurality of joints is determined based on a target trajectory of the robot, the plurality of joints being controlled based on the third control information to move the robot along the target trajectory. A respective control torque for controlling each joint in the plurality of joints is determined based on the second control information and the third control information.

17 Claims, 12 Drawing Sheets

(56) References Cited

FOREIGN PATENT DOCUMENTS

| CN | 113021299 | A | 6/2021 |
| CN | 113753150 | A | 12/2021 |
| WO | 2020/197800 | A1 | 10/2020 |

OTHER PUBLICATIONS

Office Action received for Chinese Patent Application 202210195625. 2, mailed on Jun. 17, 2024 with English translation, 12 pages.
Extended European Search Report received for European Patent Application No. 22929620.7, mailed on May 16, 2025, 8 pages.

* cited by examiner

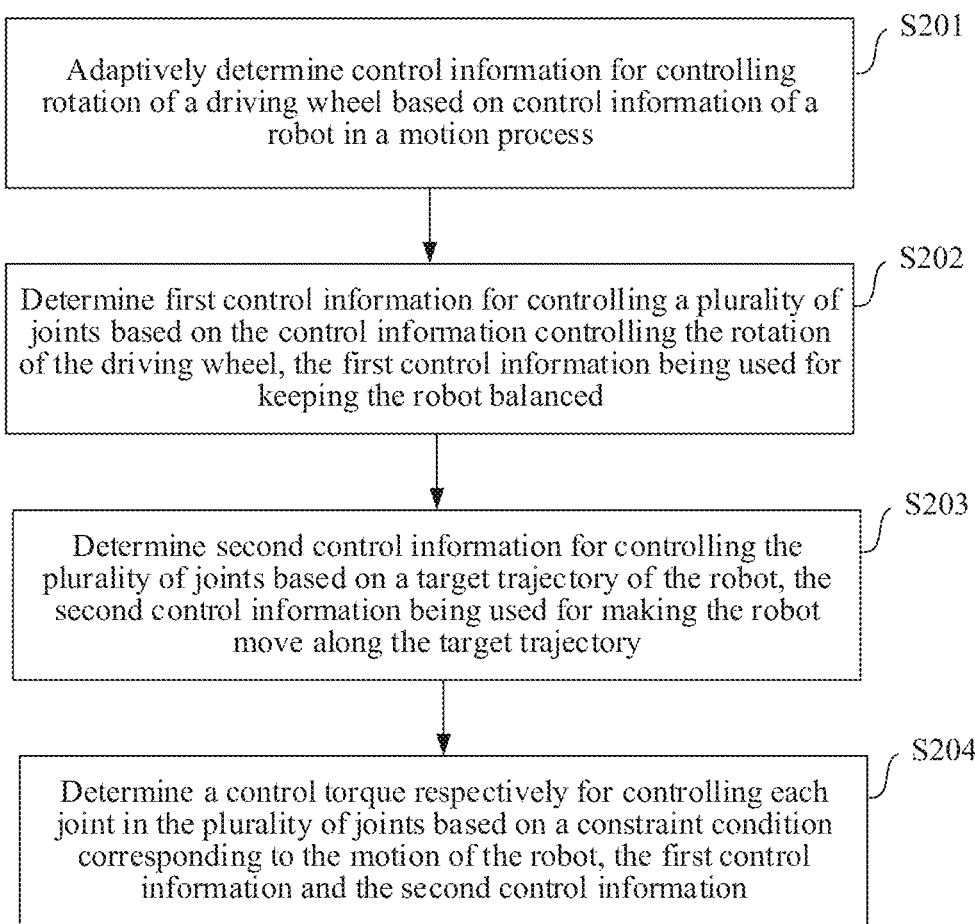

200

S201

Adaptively determine control information for controlling rotation of a driving wheel based on control information of a robot in a motion process

S202

Determine first control information for controlling a plurality of joints based on the control information controlling the rotation of the driving wheel, the first control information being used for keeping the robot balanced

S203

Determine second control information for controlling the plurality of joints based on a target trajectory of the robot, the second control information being used for making the robot move along the target trajectory

S204

Determine a control torque respectively for controlling each joint in the plurality of joints based on a constraint condition corresponding to the motion of the robot, the first control information and the second control information

FIG. 2

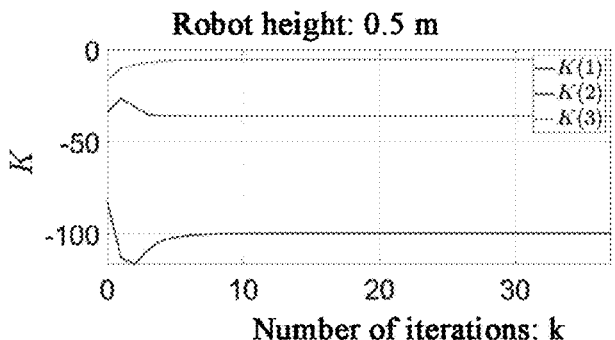
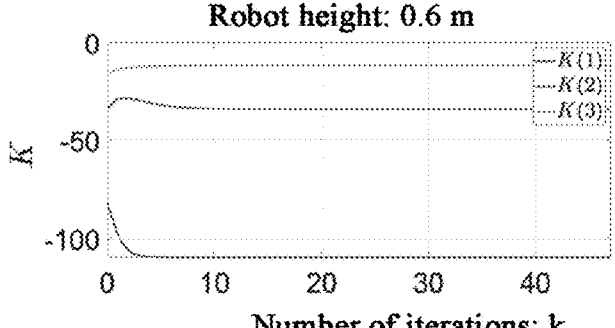
FIG. 7B
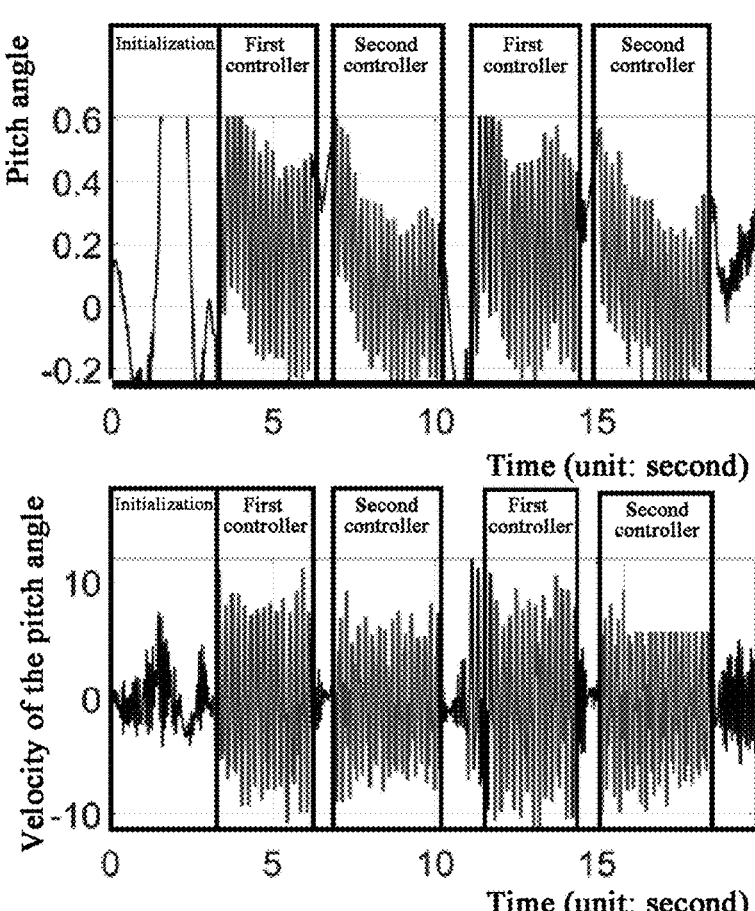
FIG. 7C

S801

Control a robot to move, and acquire motion state data and control data of the robot in a motion process

S802

Calculate a linear balance parameter matrix by a value iteration method according to the motion state data and the control data

S803

Construct a first controller corresponding to dynamic characteristics of the robot based on the linear balance parameter matrix

FIG. 8

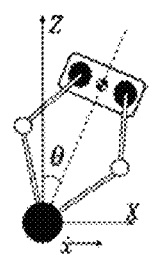

The robot loses balance due to low-velocity motion

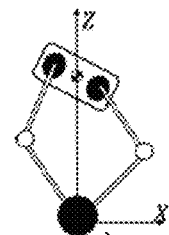

The robot loses balance due to high-velocity motion

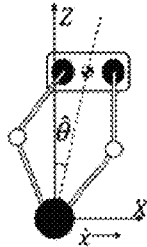

The robot keeps a balanced state/quasi-balanced state for a period of time

FIG. 9

State D
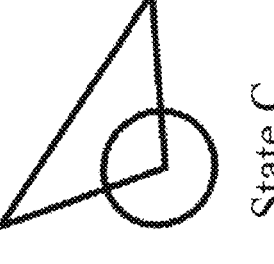
State C
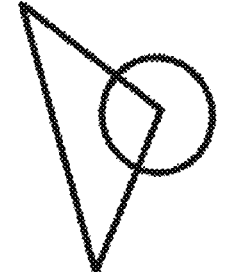
State B
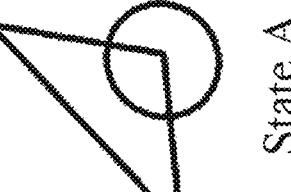
State A
FIG. 10

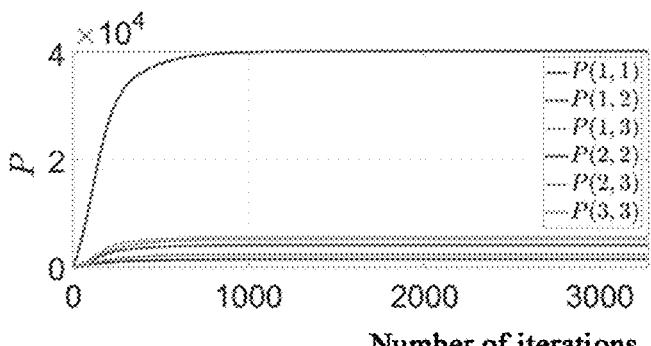
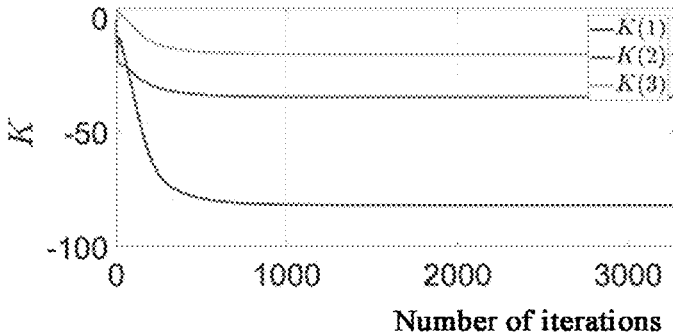
FIG. 12
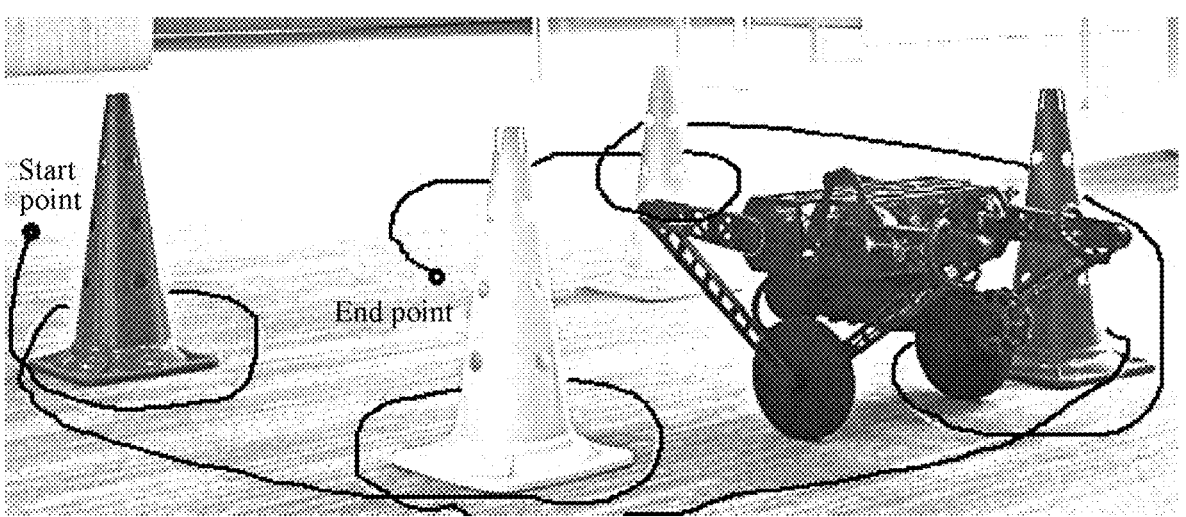
FIG. 13

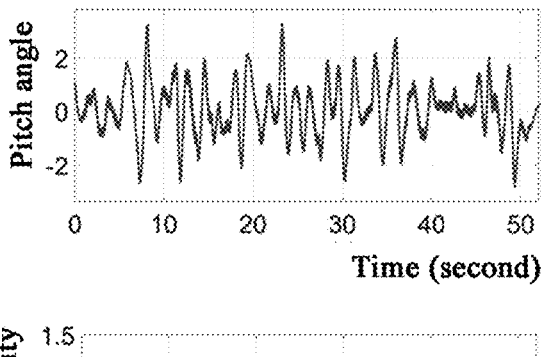
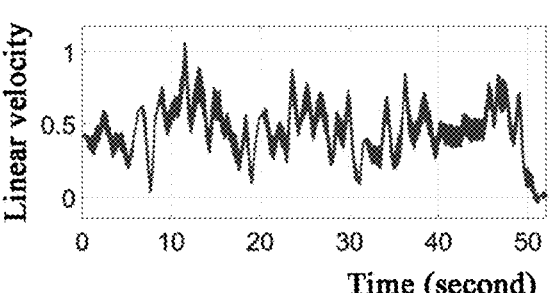
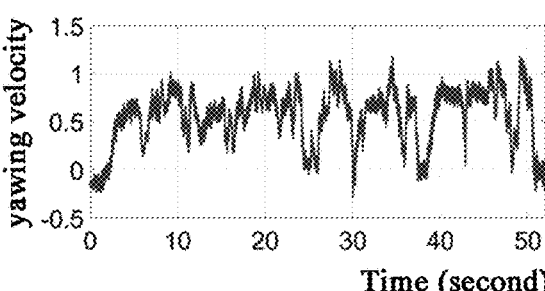
FIG. 14

ROBOT CONTROL METHOD AND APPARATUS, ROBOT AND COMPUTER-READABLE STORAGE MEDIUM

RELATED APPLICATIONS

The present application is a continuation of International Application No. PCT/CN2022/135432, filed on Nov. 30, 2022, which claims priority to Chinese Patent Application No. 202210195625.2, entitled "ROBOT CONTROL METHOD, AND ROBOT" and filed on Mar. 1, 2022. The entire disclosures of the prior applications are hereby incorporated herein by reference.

FIELD OF THE TECHNOLOGY

The present disclosure relates to the field of artificial intelligence and robots, including to a robot control method and apparatus, a robot, a computer-readable storage medium, and a computer program product.

BACKGROUND OF THE DISCLOSURE

As the artificial intelligence and robot technologies are widely used in civil and commercial fields, robots based on the artificial intelligence and robot technologies play an increasingly important role in fields such as smart transportation, smart home, and the like, and also face higher requirements.

At present, for motion control of the robot, such as an underactuated robot, it is usually necessary to design a dynamic model accurately corresponding to a mechanical structure of the robot, and then determine a control force at each joint of the robot based on changes of the dynamic model in a traveling process so as to improve and/or ensure the balance of the robot in a motion process. However, due to the complicated mechanical structure of the robot, such as some wheel-legged robots, it may still difficult to obtain the accurate dynamic model in a case of knowing the mechanical structure of the robot. In addition, even in a case where the dynamic model is already known, it may be difficult to accurately identify parameters in the dynamic model in some cases. In a case where the parameters of the dynamic model are already known but not accurate, a control effect of the robot may be unsatisfactory. Therefore, it may be necessary to provide a scheme capable of more flexibly controlling the robot.

SUMMARY

For the above problems, this disclosure provides a robot control method and apparatus, a robot, a non-transitory computer-readable storage medium, and a computer program product.

In an aspect, this disclosure provides a method of controlling a robot. The method is performed by a controller of the robot for example. In the method of controlling the robot, first control information for controlling rotation of a driving wheel of a wheel-legged part of the robot is adaptively determined based on motion information of the robot that is generated while the robot is in motion. Second control information for controlling a plurality of joints of the wheel-legged part of the robot is determined based on the first control information, the plurality of joints being controlled based on the second control information to balance the robot. Third control information for controlling the plurality of joints is determined based on a target trajectory of the robot, the plurality of joints being controlled based on the third control information to move the robot along the target trajectory. A respective control torque for controlling each joint in the plurality of joints is determined based on the second control information and the third control information.

In an aspect, this disclosure provides a robot control apparatus that includes processing circuitry. The processing circuitry is configured to adaptively determine first control information for controlling rotation of a driving wheel of a wheel-legged part of a robot based on motion information of the robot that is generated while the robot is in motion. The processing circuitry is configured to determine second control information for controlling a plurality of joints of the wheel-legged part of the robot based on the first control information, the plurality of joints being controlled based on the second control information to balance the robot. The processing circuitry is configured to determine third control information for controlling the plurality of joints based on a target trajectory of the robot, the plurality of joints being controlled based on the third control information to move the robot along the target trajectory. The processing circuitry is configured to determine a respective control torque for controlling each joint in the plurality of joints based on the second control information and the third control information.

In another aspect, this disclosure provides a robot. The robot includes the robot control apparatus, the wheel-legged part, and a base part connected to the wheel-legged part. The wheel-legged part and the base part include the plurality of joints.

In another aspect, this disclosure provides a non-transitory computer-readable storage medium, storing instructions which when executed by one or more processors cause the one or more processors to perform the method as described above.

In another aspect, this disclosure provides a computer program product, including a computer-readable instruction, the computer-readable instruction, when executed by one or more processors, implementing steps of the method as described above.

BRIEF DESCRIPTION OF THE DRAWINGS

To describe the technical schemes of the embodiments of this disclosure more clearly, the following briefly introduces the accompanying drawings. The accompanying drawings in the following description show only some embodiments of this disclosure. The following drawings are not intended to be scaled to an actual dimension, and emphasis is made on showing the subject matter of this disclosure.

FIG. 2 is an exemplary flowchart of a robot control method according to an embodiment of this disclosure.

FIG. 7B shows a convergence process of a linear balance parameter matrix in a process of constructing a second controller according to an embodiment of this disclosure, wherein a height of a base part of a robot is 0.5 m and 0.6 m.

FIG. 7C shows motion state data of a robot that is controlled respectively by a first controller and a second controller to walk in a straight line in a case where the height of the base part is 0.6 m.

FIG. 8 is an exemplary flowchart of a robot control method according to an embodiment of this disclosure.

FIG. 9 is an exemplary schematic diagram of a robot control method according to an embodiment of this disclosure.

FIG. 10 is a schematic diagram of a process of acquiring motion state data and control data of a robot according to an embodiment of this disclosure.

FIG. 12 is an iteration schematic diagram of a linear balance parameter matrix in a process of acquiring a robot according to an embodiment of this disclosure.

FIG. 13 is a schematic diagram of an experiment of testing a controller of a robot according to an embodiment of this disclosure.

FIG. 14 shows experimental data of testing a controller of a robot according to an embodiment of this disclosure.

DESCRIPTION OF EMBODIMENTS

The technical schemes in embodiments of this disclosure are described below with reference to the accompanying drawings. The described embodiments are merely some rather than all of the embodiments of this disclosure. Other embodiments are within the scope of this disclosure.

As shown in this disclosure and the claims, words such as "a/an," "one," "one kind," and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

Although this disclosure makes various references to some modules in the system according to the embodiments of this disclosure, any quantity of different modules may be used and run on a user terminal and/or a server. The modules are only illustrative, and different aspects of the system and method may use different modules.

Flowcharts are used in this disclosure for illustrating operations performed by the system according to the embodiments of this disclosure. It is to be understood that, the foregoing or following operations are not necessarily strictly performed according to an order. On the contrary, all steps may be performed in a reverse order or simultaneously. Meanwhile, other operations may also be added to the processes. Alternatively, one or more operations may be deleted from the processes.

Technical schemes of this include schemes relating to robot technologies in artificial intelligence technologies and intelligent control of a robot. The robot may be a kind of mechanical and electronic equipment integrating mechanical drive and modern microelectronics technology and capable of imitating a certain skill of human beings. The robot may be developed on the basis of electronics, machinery and information technology. The robot may not necessarily look like a human being. For example, as long as the robot can independently complete tasks and commands given by the human beings, it may be considered as belonging to the robot family. The robot may be an automatic machine, which has some intelligent abilities similar to the human beings or creatures such as the abilities of perception, planning, action, and coordination. The robot may be an automatic machine with high flexibility. With the development of computer technology and artificial intelligence technology, the robot is greatly improved in functionality and technology, which is typically represented by techniques such as vision, touch, and the like of mobile robots and robots.

This disclosure relates to an application of artificial intelligence in an aspect of robot control, including a robot control method based on artificial intelligence.

Figure 1:
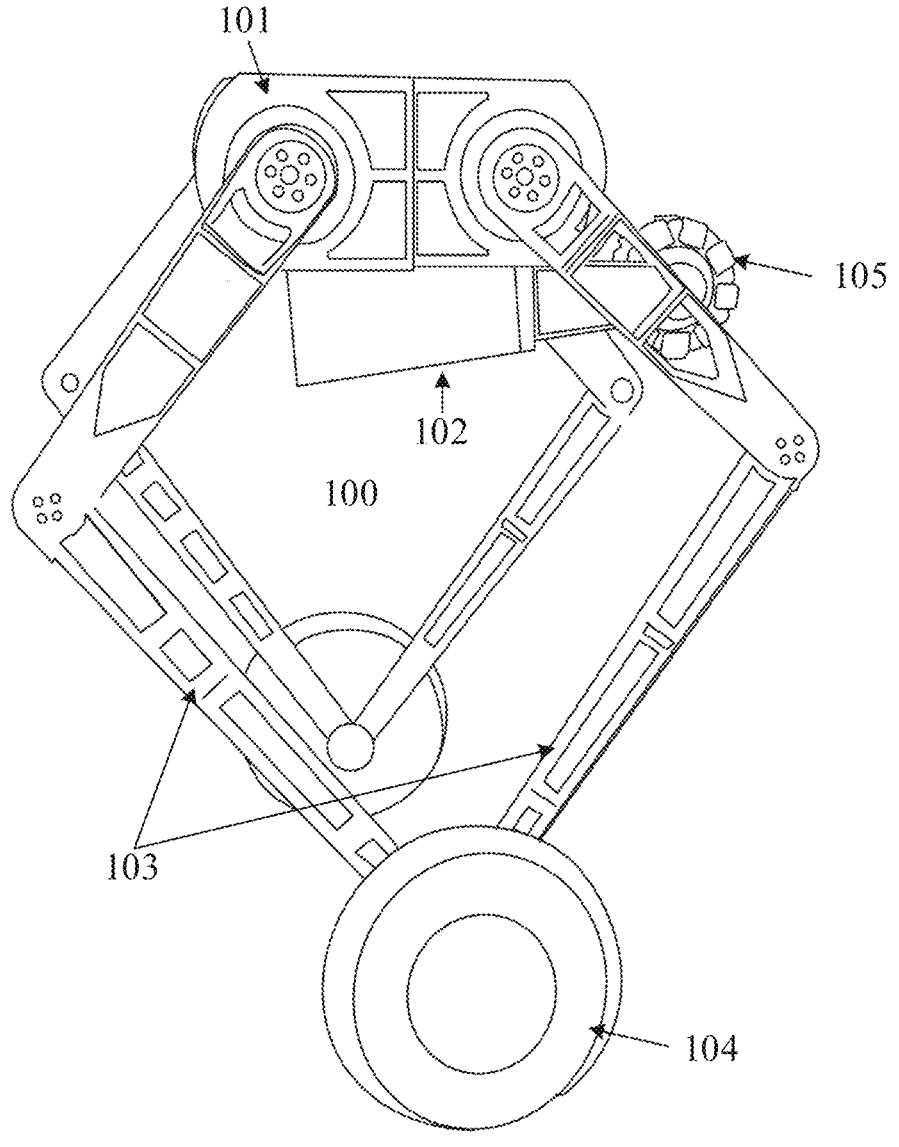
FIG. 1 is a schematic structural diagram of a robot with a left wheel-legged part and a right wheel-legged part of a single wheel-legged configuration according to an embodiment of this disclosure.

The robot involved in this disclosure may be an under-actuated robot, and the under-actuation may be a nonlinear control object with the number of independent control variables less than the number of degrees of freedom. For example, the underactuated robot may be a wheel-legged robot shown in FIG. 1. FIG. 1 is a schematic structural diagram of a robot with a left wheel-legged part and a right wheel-legged part of a single wheel-legged configuration according to an embodiment of this disclosure.

As shown in FIG. 1, FIG. 1 exemplarily shows a schematic structural diagram of a robot 100. The wheel-legged robot 100 may include wheel-legged parts 103, and the wheel-legged part 103 includes a driving wheel 104, which may also be referred to as a foot part, and a plurality of joints. The wheel-legged robot 100 may also include a base part 101. The base part 101 may refer to a main portion of the robot, for example, the base part may be a trunk part of the robot. The base part, for example, may be a panel-like part or a cuboid-like part connected to the wheel-legged part of the robot. As an example, one end of the wheel-legged part 103 is connected with the base part 101, and the other end is connected with the driving wheel 104. The base part 101 is provided with a power output apparatus (such as a motor) which can be configured to provide power for driving the joints of the wheel-legged part 103. According to practical needs, for example, the robot may also include a base part connected to the wheel-legged part or an additional component arranged on the base part. A structural example of the robot is only illustrated above. The embodiment of this disclosure is not limited by specific constituent components and connections of the robot.

The driving wheel 104 in the wheel-legged part 103 may enable the wheel-legged robot 100 to walk and perform wheeled motion. The wheel-legged robot 100 may also include a controllable additional component (such as a tail). The tail may be configured to balance the wheel-legged robot, or assist the wheel-legged robot in moving. For example, the tail may assist the wheel-legged robot in keeping balanced during the motion. The wheel-legged robot may also include a controllable robot arm which may be configured to execute operating tasks such as carrying, picking, and the like. The wheel-legged robot may include a multi-foot wheel-legged robot, such as a double-foot wheel-legged robot, a four-foot wheel-legged robot, and the like.

For example, the wheel-legged part 103 is a parallel-structure leg (a balance point is located between two legs of the two-foot wheel-legged robot 100). Referring to FIG. 1, the wheel-legged part 103 of the robot 100 includes a left wheel-legged part and a right wheel-legged part. Each of the left wheel-legged part and right wheel-legged part includes a driving wheel and two parallel legs. The two parallel legs are connected to a central shaft of the driving wheel and configured to realize the motion control for the driving wheel. For example, the left wheel-legged part includes a left driving wheel, a first left wheel-legged part and a second left wheel-legged part, and the first left wheel-legged part and the second left wheel-legged part are connected in parallel; and the right wheel-legged part 112, for example, includes a right driving wheel, a first right wheel-legged part, and a second right wheel-legged part, and the first right wheel-legged part and the second right wheel-legged part are connected in parallel. As shown in FIG. 1, the left wheel-legged parts and the right wheel-legged parts are in mirror symmetry.

For example, the driving wheel, for example, may be a driving wheel configuration of a single wheel, two wheels, four wheels or other number of wheels. The motion of each driving wheel may be controlled by two parallel legs or a plurality of concatenated legs. The embodiment of this disclosure is not limited by a specific configuration type of the left and right wheel-legged parts and the number of the driving wheel. In some embodiments, both the left wheel-legged part and the right wheel-legged part are of a single wheel-legged configuration. The single wheel-legged configuration refers to that the wheel-legged part includes only a single driving wheel.

For example, the left wheel-legged part and the right wheel-legged part may include the same number of joints and the same joint configuration, or the left wheel-legged part and the right wheel-legged part may have different numbers of joints or different joint configurations according to the practical need, or have different numbers of joints and different joint configurations. The embodiment of this disclosure is not limited by a specific joint number and joint configuration of the left and right wheel-legged parts. By taking an example shown in FIG. 1 as an example, the left and right wheel-legged parts each includes 5 joints with 2 rotational degrees of freedom. A height of a mass center of the wheel-legged part/base part and an inclination angle of the base part may be regulated by regulating the joints of the wheel-legged part 103.

The leg of the robot may be of a concatenated structure or a parallel structure. Compared with the concatenated structural leg, the parallel structural leg can have higher stiffness, which may bear an impact that may be brought in a complicated motion. During contacting the ground, the driving wheel 104 may provide the wheel-legged robot 100 with the sliding ability. The double-foot wheel-legged robot 100 may also include an additional component 102. The additional component 102 is connected with the base part 101. The additional component 102 may be provided with a driven wheel 105. The additional component 102 includes 1 rotational degree of freedom. The motion of the additional component 102 may also affect the change of the base part 101 and the wheel-legged part 103. For example, the location change of the additional component may drive the base part to have certain rotational velocity. Thus, the balance and posture of the robot 100 may be regulated by regulating the location of the additional component 102.

The wheel-legged robot 100 not only has the flexibility of a wheeled robot but also the flexibility of a legged robot.

Therefore, the wheel-legged robot 100 may move quickly on the flat ground, and may also cross the fluctuated road. However, for some wheel-legged robots (similar to the wheel-legged robot 100 shown in FIG. 1), there are only two contact points between the robot and the ground. The wheel-legged robot 100 is a non-minimum phase system, so that it may still be difficult to perform balance control for the wheel-legged robot 100 in the practical application. In addition, due to the complicated mechanical structure of the (wheel-legged) robot, it may be difficult to determine dynamic characteristics of the (wheel-legged) robot. Since the traditional balance control method needs to know the dynamic characteristics of the robot, the traditional balance control method may be difficult to perform the balance control for the robot without knowing the dynamic characteristics.

In an example, by combining the whole-body dynamic technology, an embodiment of this disclosure provides a robot control method based on adaptive dynamic planning. The robot control method takes an output of a controller of a component (such as the driving wheel) of the robot calculated based on the adaptive dynamic planning as a reference parameter of the whole-body dynamic control, so that the controller of the joint can cooperate with the controllers of other joints, thereby improving the overall motion flexibility of the robot. The adaptive dynamic planning method may be implemented by at least one of a data-driven policy iteration (PI) scheme (or algorithm) and a data-driven value iteration (VI) scheme (or algorithm). The robot control method provided by the embodiment of this disclosure uses the adaptive dynamic planning (ADP) method and the whole-body dynamic method to design the controller enabling the robot with unknown dynamic characteristics to maintain balance during the motion. The ADP fundamentally addresses the problem of infinite-horizon LQR, but parameters of a system model are unknown or completely unknown. Therefore, the Algebraic Riccati equation may not be solved analytically. The embodiment of the invention realizes that a solution of the LQR problem can still be obtained by using the artificial intelligence scheme in a case that the LQR problem cannot be solved based on the system model.

Based on the artificial intelligence technology, such as reinforcement learning and ADP technology, the embodiment of this disclosure addresses the optimal balance control problem of at least one joint controller of the robot by using policy iteration, value iteration or whole-body dynamic control technology without knowing the dynamic characteristics of the robot. In the process of constructing the controller in the embodiment of this disclosure, the wheel-legged robot may only need to travel for a period of time or trajectory under the control of a non-optimal controller or an arbitrary controller, and motion state data and control data corresponding to the period of time or trajectory are collected as training data. Thus, the quantity of the training data in the embodiment of this disclosure is far less than a data volume required in the traditional reinforcement learning algorithm.

Further, the trained controller in the embodiments of this disclosure gradually converges to the controller corresponding to an optimal solution of a linear quadratic regulation problem with the increase of a learning step length, so that the stability of a closed-loop system may be improved and/or ensured, and the training process is greatly simplified. Moreover, the training data does not need to be limited additionally, so that a design process of the controller of the wheel-legged robot is simplified. Further, in all embodiments of this disclosure, the data is acquired from the real robot, and the control policies obtained based on the data of the real robot are applied directly to the robot, so that it may be unnecessary to consider the difference between analog control and real control, and the application effect of the controller on the real robot is improved.

In order to further describe this disclosure, exemplary meanings of various operators and sets that may be used below are explained simply first.

In this disclosure, $\mathbb{R}$ indicates a set of real numbers. $|\cdot|$ indicates Euclidean norm of a vector. $\otimes$ indicates a Kronecker product. A bold-type letter represents the vector or a matrix. An italic letter represents a scalar.

For an arbitrary matrix $$A = [a_1, \ldots, a_n], vec(A) = [a_1^T, \ldots, a_n^T]^T.$$

For an arbitrary symmetric matrix $S=[s_{i,j}]$, $vecs(S)=[s_{1,1}, 2s_{1,2}, \ldots, 2s_{1,n}, 2_{2,2}, 2s_{2,3}, \ldots, 2s_{n-1,n}, s_{n,n}]^T$. For an arbitrary vector $$x \in \mathbb{R}^n, vecv(x) = [x_1^2, x_1x_2, \ldots, x_1x_n, x_2^2, \ldots, x_n^2]^T.$$

FIG. 2 is an exemplary flowchart of a robot control method 200 according to an embodiment of this disclosure.

As shown in FIG. 2, the method 200 according to at least one embodiment of this disclosure may include step S201 to step S204. Step S201 to step S204 may be performed on-line or off-line. This disclosure is not limited thereto.

Figure 3:
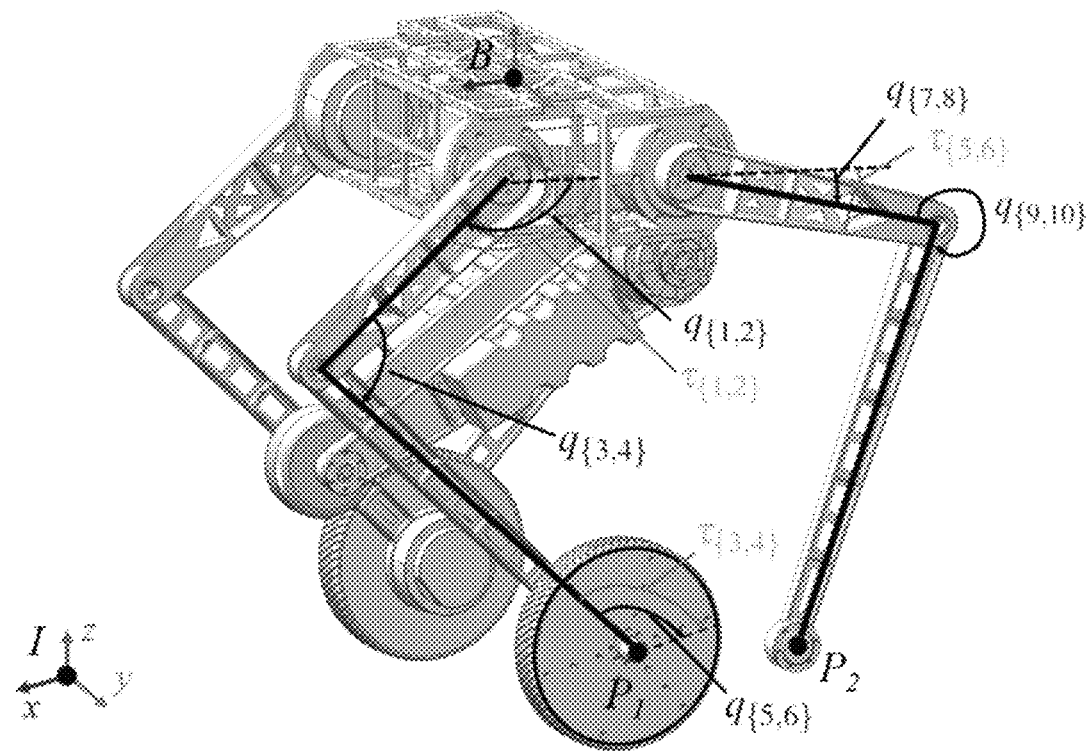
FIG. 3 is a corresponding marking schematic diagram of a robot according to an embodiment of this disclosure.

As described above, the method 200 may be applied to any robot including a wheel-legged part including a driving wheel and a plurality of joints. For convenience in description, by taking the robot 100 shown in FIG. 1 as an example, the method 200 is further described below. For convenience in describing various characteristic quantities involved in the method 200, the robot 100 in FIG. 1 is further marked with reference to FIG. 3. As shown in FIG. 3, due to the complicated mechanical structure of the robot 100, it may be difficult to acquire accurate dynamic characteristics corresponding to the robot 100. For convenience in controlling the robot, the joints of the robot may be further identified to facilitate the construction of a dynamic model of the robot. The dynamic model is used for representing a change relationship between each joint and a centroid angle, an angular velocity, an angular acceleration, a joint torque, and an external contact force in a motion process of the robot. For example, the dynamic model may describe the above-mentioned change relationship from the perspective of energy change.

For example, as shown in FIG. 3, the complicated robot 100 shown in FIG. 1 may be marked in a generalized coordinate system of the robot. To facilitate the marking, in FIG. 3, centers $P_1$ and $P_2$ of the driving wheels are shown as two separated points. A person skilled in the art may understand that $P_1$ and $P_2$ are actually the same point.

For example, in FIG. 3, $q_{\{\cdot,\cdot\}}$ and $\tau_{\{\cdot,\cdot\}}$ are respectively used for identifying parameters of each joint of the wheel-legged part, where $q_{\{\cdot,\cdot\}}$ identifies a rotational angle of the joint, and $\tau_{\{\cdot,\cdot\}}$ identifies a torque of the joint. For example, $q_{\{1,2\}}$ identifies the rotational angle of the joint between a first linkage and the base part of the left wheel-legged part of the robot, while $\tau_{\{1,2\}}$ identifies the rotational torque of the joint between the first linkage and the base part of the left wheel-legged part of the robot. Although there is no illustration in FIG. 3, the angle and rotational torque of a tail joint may be set correspondingly.

For any robot with the base part, $$q = [q_{fb}^T, q_J^T]^T$$

may be used for representing the generalized coordinates of the robot. A generalized coordinate parameter $$q = [q_{fb}^T, q_J^T]^T$$

of the robot includes a posture $q_{fb} \in \mathbb{R}^3 \times SO(3)$ of the base part and $n_j$ joint angles $q_J=[q_1, q_2, \ldots, q_{n_j}]^T$. For the robot shown in FIG. 1 and FIG. 3, the generalized coordinate parameter q may also be obtained in a similar way, where $n_j=12$ and $q_i$ may be any joint identified with $q_{\{\cdot,\cdot\}}$ in FIG. 3.

Based on the generalized coordinate parameter q of the robot, a generalized velocity set $$\dot{q} = [\dot{q}_{fb}^T, \dot{q}_J^T]^T$$

and a generalized acceleration set $$\ddot{q} = [\ddot{q}_{fb}^T, \ddot{q}_J^T]^T$$

of the robot joint may be determined. A person skilled in the art may understand that $\dot{q}_{fb}$ and $\ddot{q}_{fb}$ respectively indicate an instantaneous angular velocity and an instantaneous angular acceleration of a robot body. Similarly, the joint torque may also be identified with $\tau=[\tau_1, \tau_2, \ldots, \tau_8]^T$.

Thus, the universal dynamic model shown in the following formula (1) may be constructed. Values of various parameters in the following formula (1) may be known or unknown, which is not limited by this disclosure.

$$M(q)\ddot{q} + C(q, \dot{q}) = S^T\tau + J_f^T f + 1_\lambda^T \lambda \qquad (1)$$

where $M(q) \in \mathbb{R}^{(6+n_j) \times (6+n_j)}$, and M(q) is used for indicating a mass matrix of the robot. $C(q,\dot{q}) \in \mathbb{R}^{(6+n_j)}$, which is used for representing a gravity, a centrifugal force and a Coriolis force of the robot. $S=[0_{n_j \times 6} I_{n_j \times n_j}]$, the matrix S is used for selecting a driving joint from all joints, where in a case that a value of an element in S is 0, it is represented that the element is an un-driven joint. In a case that the element value is not 0, the element is identified as the driving joint. f is a generalized force provided by the ground at a contact point where the robot contacts the ground. $J_f \in \mathbb{R}^{3n_c \times (n_j+6)}$, $J_f$ is a concatenated contact Jacobian matrix for f. $\lambda$ is a closed-loop force that a front leg acts on a rear leg. $J_\lambda \in \mathbb{R}^{3n_\lambda \times (n_j+6)}$, $J_\lambda$ is a concatenated contact Jacobian matrix for $\lambda$. $n_c$ is the number of contact points between the driving wheel and the ground. In consideration of closed-loop constraint (that is, all joints of the real robot are fixedly connected), $n_\lambda$ is the number of contact points between open-loop links. For the robot shown in FIG. 1 and FIG. 3, $n_c=2$, and $n_\lambda=2$. In an example, the wheel-legged part of the robot is a five-link mechanism. The number of the contact points between the open-loop links (such as between the points $P_1$ and $P_2$ in FIG. 3) of the closed-loop constraint of the five-linkage mechanism is 2.

Figure 4:
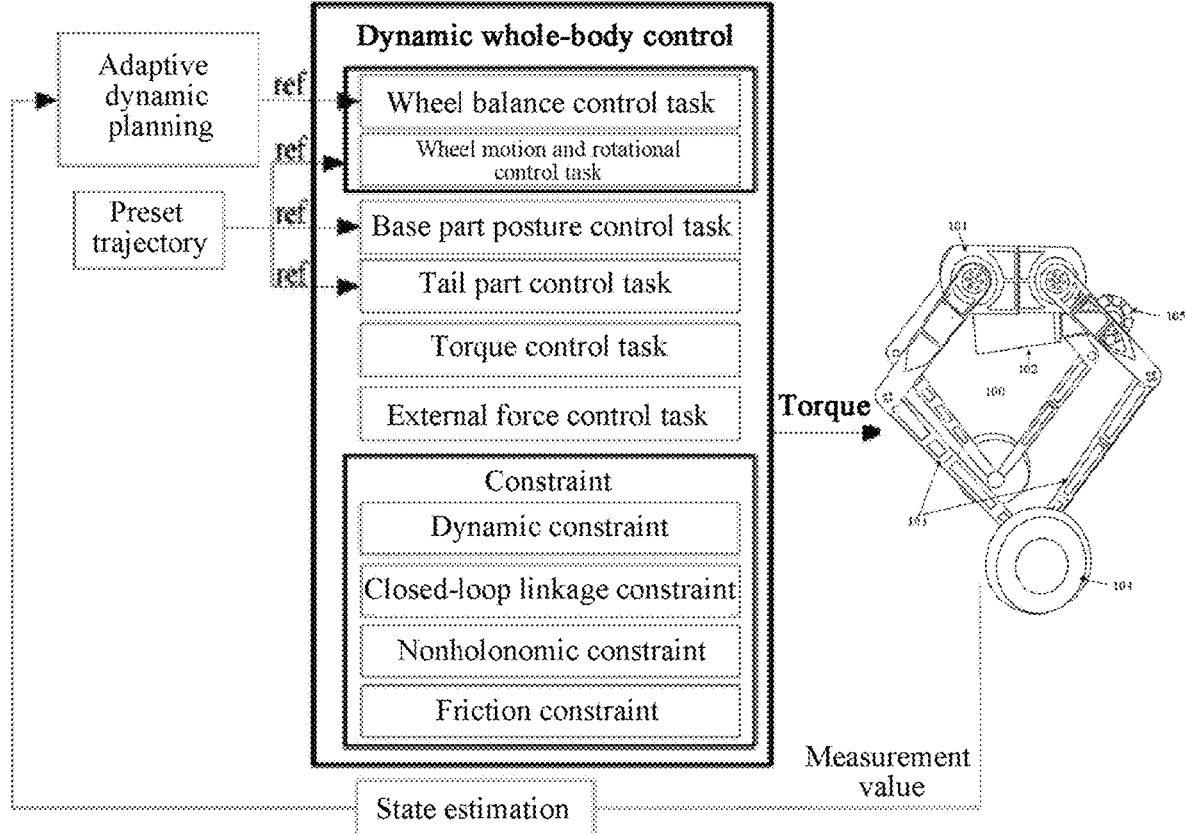
FIG. 4 is a corresponding control architectural diagram of a robot according to an embodiment of this disclosure.

Based on the obtained robot configuration, a traveling process of the robot may be considered, a corresponding control architecture and control task are set for the robot, and the control architecture and the control task are described by using the mathematical language. The above control architecture and the control task are further described with reference to FIG. 4. FIG. 4 is a corresponding control architectural diagram of a robot according to an embodiment of this disclosure; for example, by taking the robot marked in FIG. 3 as an example, FIG. 4 shows a plurality of exemplary control tasks for the robot and an association between the control tasks. The combination and association of the exemplary control tasks may also be referred to as dynamic whole-body dynamic control corresponding to the robot.

For example, in step S201, control information for controlling rotation of the driving wheel is adaptively determined based on motion information of the robot in the motion process.

The motion process of the robot is relative to the stationary state of the robot. In the motion process of the robot, the wheel-legged part of the robot is in a moving state under the drive of the driving wheel and a plurality of joints. The driving wheel and a plurality of joints on the wheel-legged part are driven to move, and an acting force on the driving wheel and a plurality of joints may be provided by a connected actuating apparatus. The actuating apparatus is controlled by a controller through the control information.

The motion information of the robot may include parameters such as a centroid angle, an angular velocity, an angular acceleration, a joint torque, an external contact force, and the like, and may also include a change relationship between each joint and each parameter. Adaptively determining the control information refers to a process of adaptively determining the control information that is most adaptive to the motion process of the robot by a data iteration method.

In an example, based on the motion information of the robot in the motion process, the adaptively determining the control information controlling the rotation of the driving wheel includes: based on the motion information of the robot in the motion process, the controller for controlling the rotation of driving wheel is determined by a policy iteration method, or based on the motion information of the robot in the motion process, the controller for controlling the rotation of the driving wheel is determined by a value iteration method. Respectively referring to FIG. 5A to FIG. 7C, an example of how to determine the controller for controlling the rotation of the driving wheel by the policy iteration method is described in detail below. Referring to FIG. 8, an example of how to determine the controller for controlling the rotation of the driving wheel by the value iteration method is described in detail below. In addition, FIG. 4 also shows another example, which estimates a motion state of the robot by using a measurement value, and then inputs a value after the state estimation into a data processing module for adaptively determining the control information controlling the rotation of the driving wheel, so that the data module can quickly learn the measurement value corresponding to each moment so as to more efficiently calculate the optimal control information for controlling the rotation of the driving wheel.

In an example, the control information for controlling the rotation of the driving wheel may be an acceleration of the driving wheel, or the torque of the driving wheel. Although the two physical quantities serving as the control information controlling the rotation of the driving wheel are not quite different in a mathematical sense. However, in a real physical system, not both of the two physical quantities may be measured accurately. Therefore, a person skilled in the art may select the physical quantity with good data test effect and more in line with the model for subsequent calculation and iteration according to a specific situation in an experiment.

In step S202, determine first control information for controlling a plurality of joints based on the control information controlling the rotation of the driving wheel, the first control information being used for keeping the robot balanced.

The first control information may be control information for regulating and controlling the configuration of the robot. By regulating the configuration of the robot, the center of gravity of the robot may be lowered or raised to dynamically keep the balance of the robot. A rotational velocity of the driving wheel may not only affect a linear velocity of the robot, but also affect the traveling balance of the robot. For the robot 100 shown in FIG. 1 and FIG. 3, in a case where the driving wheel 104 provides an excessively large acceleration, the robot 100 may fall backward quickly. Therefore, the embodiment of this disclosure takes the control information of the driving wheel as the reference information for controlling each joint, so as to dynamically keep the balance of the robot by regulating the configuration of the robot, for example, lowering/raising the center of gravity, in a case that the velocity of the driving wheel 104 is too high. As an example, referring to FIG. 4, the first control information may be an output of a wheel balance control task, and the wheel balance control task is described in detail below.

In step S203, determine second control information for controlling a plurality of joints based on a target trajectory of the robot, the second control information being used for making the robot move along the target trajectory.

The second control information may be control information for regulating a posture of the base part, and the potential energy is converted into dynamic energy by regulating the posture of the base part so as to assist robot in moving.

In an example, in a case where the driving wheel 104 provides excessively small acceleration, the robot cannot arrive at a destination quickly, which cannot meet the requirement of the target trajectory that the motion of the robot 100 needs to satisfy. Thus, the robot 100 shown in FIG. 1 and FIG. 3 may convert the potential energy into the dynamic energy to assist the robot in moving by further regulating the posture of the base part. In addition, for some rotational target trajectories, for example, the robot travels in an S-shaped curve. The target trajectory is also used as a reference to assist the robot in regulating the posture and the velocity. As an example, referring to FIG. 4, the second control information may be an output of any one of a wheel motion and rotational control task, a base part posture control task and a tail part control task. The wheel motion and rotational control task, the base part posture control task and the tail part control task are described in detail below.

In step S204, determine a control torque respectively for controlling each joint in the plurality of joints based on a motion constraint condition of the robot, the first control information and the second control information.

The motion constraint condition of the robot refers to a constraint condition that all parameters of the robot need to meet theoretically in the motion process. The motion constraint condition may be at least one of a dynamic constraint condition, a closed-loop linkage constraint condition, a nonholonomic constraint condition and a friction constraint condition.

Since all joints of the wheel-legged part are controlled separately in the motion process of the robot, in order to enable the robot to move along the target trajectory, it may be necessary to determine the control torque respectively for each joint in the plurality of joints, so that each joint is controlled according to the determined control torque, and the robot is driven to move along the target trajectory.

As an example of step S204, further, based on the first control information and the second control information, at least one candidate control torque combination corresponding to a plurality of joints of the robot is determined. The at least one candidate control torque combination satisfies the motion constraint condition of the robot; based on the at least one candidate control torque combination, a value corresponding to a dynamic whole-body dynamic target function of the robot is determined; and the candidate control torque combination enabling the dynamic whole-body dynamic target function to reach an extreme value is selected from the at least one candidate control torque combination, and each candidate control torque in the candidate control torque combination is used as the control torque respectively for controlling each joint in the plurality of joints.

For example, the dynamic whole-body dynamic control corresponding to the robot may be described as controlling each joint of the robot with a target of minimizing the total input energy of each joint and minimizing an error with the target trajectory in a case of improving and/or ensuring the balance of the robot. For example, the dynamic whole-body dynamic control target $$\underset{(\tau, f, \lambda)}{\text{argmin}} \, z = \left\| \ddot{q}^{des} - \ddot{q} \right\|_{w_q}^2 + \left\| \tau^{des} - \tau \right\|_{w_\tau}^2 + \left\| f \right\|_{w_f}^2 + \left\| \lambda \right\|_{w_\lambda}^2 \qquad (2)$$

for the robot marked in FIG. 3 may be expressed with formula (2).

$$\underset{(\tau, f, \lambda)}{\text{argmin}} \, z = \left\| \ddot{q}^{des} - \ddot{q} \right\|_{w_q}^2 + \left\| \tau^{des} - \tau \right\|_{w_\tau}^2 + \left\| f \right\|_{w_f}^2 + \left\| \lambda \right\|_{w_\lambda}^2 \qquad (2)$$

where as described above, $\ddot{q}^{des}$ fides is a vector formed by combining sets of accelerations of the target trajectory set for each joint. $\ddot{q}$ is a vector formed by combining sets of accelerations of each joint in the motion process. $\tau^{des}$ is a vector formed by combining sets of torques of the target trajectory set for each joint. $\tau$ is a vector formed by combining sets of torques of each joint in the actual motion process. f is a generalized force provided by the ground at a contact point where the robot actually contacts the ground. $\lambda$ is a closed-loop force that a front leg acts on a rear leg in the motion process of the robot. Subscripts $W_q$, $W_\tau$, $W_f$, $W_\lambda$ respectively identify weight coefficient matrices that need to be multiplied by $\ddot{q}$, $\tau$, f and $\lambda$ in response to calculation of a norm of the formula (2).

As shown in FIG. 4, the control information that is determined by the adaptive dynamic planning may be used for controlling the driving wheel shown in FIG. 1 and FIG. 3. The motion state and dynamical state of the driving wheel may correspondingly provide input reference or input limitation for various control tasks so as to change the posture and balanced state of the robot. Correspondingly, in order to prevent the robot from losing the balance, active joints (such as $q_{\{1,2\}}$ and $q_{\{7,8\}}$) in FIG. 3 may rotate under a collective action of the driving wheel (such as $q_{\{1,2\}}$) and un-driven joints (such as $q_{\{3,4\}}$ and $q_{\{9,10\}}$) and the joint torque (such as $\tau_{\{1,2\}}$ and $\tau_{\{5,6\}}$) so as to regulate the posture of the robot, so that the robot keeps balanced.

As shown in FIG. 4, the rotation of the driving wheel under the control of the control information obtained by adaptive dynamic planning may provide the input reference Ref for at least one of the wheel balance control task and the wheel motion and rotational control task. The target trajectory may provide the input reference for the wheel motion and rotational control task, the base part posture control task and the tail part control task. Although the driving wheel and the target trajectory do not provide the input reference directly for other control tasks (such as torque control task and external force control task), by considering that each control task always needs to control the same robot component (such as the driving wheel, a connecting rod assembly, a joint hinge, and the like), a control effect of these control tasks is always limited by the driving wheel and the target trajectory.

Further referring to FIG. 4, the motion of the robot is also limited by various constraints, such as the limitation of a maximal torque and a mechanical configuration that can be provided by each joint. FIG. 4 shows four exemplary constraints, i.e., a dynamic constraint, a closed-loop linkage constraint, a nonholonomic constraint and a friction constraint.

As an example, the dynamic model shown in formula (1) may be used as an example of the dynamic constraint so as to limit a change range of energy of the robot in the motion process. A person skilled in the art may understand that the limitations of the dynamic model are not limited to this. For example, for convenience in analyzing the energy change of the robot, a simplified dynamic model may be constructed for the robot so as to simplify the corresponding dynamic model limitations of formula (1) in the dynamic whole-body dynamic control.

As another example, formula (3) shows an example of the closed-loop linkage constraint for the robot in FIG. 3. A person skilled in the art may understand that the closed-loop linkage constraint may also be shown in other manners. This disclosure is not limited to this.

$$J_\lambda \ddot{q} + \dot{J}_\lambda \dot{q} = 0 \qquad (3)$$

where $$J_\lambda^T = \left[ J_{P_1,l}^T - J_{P_2,l}^T J_{P_1,r}^T - J_{P_2,r}^T \right]^T \cdot J_{P_1}$$

and $J_{P_2}$ are Jacobian matrices corresponding to points $P_1$ and $P_2$. Subscripts $J_{\cdot,l}$ and $J_{\cdot,r}$ respectively identify the left wheel-legged part and the right wheel-legged part.

As another example, assuming that the wheel is in a pure rolling manner and in contact with the ground, there is no slippage and sliding of the wheel in a radial direction and axial direction. Formula (4) shows an example of a nonholonomic constraint for the robot in FIG. 3. A person skilled in the art may understand that the nonholonomic constraint may also be shown in other manners. This disclosure is not limited to this.

$$_B J_w^{(1,3)} \ddot{q}_B + \dot{J}_w^{(1,3)} \dot{q} = 0 \tag{4}$$

Where $$_B J_w^{(1,3)}$$

is an x axis and a y axis of the Jacobian matrix of the driving wheel-ground contact point relative to the base part.

By continuing the example in FIG. 4, the friction constraint may also be set based on the following hypotheses: a friction cone at a contact point between the ground and the robot in the practical motion process is approximated as a pyramid-shaped friction pyramid. In a local coordinate system of a contact force $f_i$ corresponding to each contact point, by giving a friction coefficient $\mu$, the friction constraint may be expressed as $|f_{i,x}| \leq \mu f_{i,z}$ and $|f_{i,y}| \leq \mu f_{i,z}$.

Except for the four constraints shown in FIG. 4, a unilateral constraint may also be set correspondingly. An example of the unilateral constraint may be $f_{i,z} > 0$.

Under the above various constraints, a control model of each control task may be determined correspondingly. The rotation of the driving wheel under the control of the control information obtained by adaptive dynamic planning may provide input reference for the wheel balance control task, while the target trajectory may provide the input reference for other control tasks. For example, the rotational velocity of the driving wheel may affect the posture and velocity of the base part, while the posture and velocity of the base part may affect the balanced state of the robot.

As an example of the wheel balance control task, in order to control the motion of the base part, an expected acceleration $\ddot{q}_{fb}$ of the base part may be calculated by using a PD control law (a proportional differential controller). In an example, at least some parameters of the PD control law are obtained based on the input reference for the posture and the input reference for the velocity.

The input reference for the posture may also be referred to as a reference posture, which indicates that: the rotation of the driving wheel under the control of the control information obtained by adaptive dynamic planning leads to the change of the posture of all joints except for the joint $q_{\{5,6\}}$. The input reference for the velocity is also referred to as a reference velocity, which indicates that: the rotation of the driving wheel under the control of the control information obtained by adaptive dynamic planning leads to the change of velocity of all joints except for the joint $q_{\{5,6\}}$. That is, $$\ddot{q}_i^{des}$$

in formula (2) may also be expressed approximately by using formula (5).

$$\ddot{q}_i^{des} = \begin{cases} k_{q,p}(q_i^{ref} - q_i) + k_{q,d}(\dot{q}_i^{ref} - \dot{q}_i), & i \neq 5, 6, \\ 0, & i = 5, 6 \end{cases} \tag{5}$$

In addition, $$\tau_i^{des}$$

in formula (2) may also be further expressed approximately by using formula (6). In formula (6), it is assumed that the torque of other joints $$\tau_i^{des}(i \neq 3, 4)$$

except for the joint $q_{\{5,6\}}$ is approximated as zero.

$$\tau_i^{des} = \begin{cases} \tau^{ADP} & i = 3, 4, \\ 0, & i \neq 3, 4 \end{cases} \tag{6}$$

For another example, by taking the robot described in FIG. 1 to FIG. 3 as an example, the input reference for the posture includes: a distance from the gravity center of the robot to a center of a connecting line of the driving wheels projected on the ground (for example, identified with state_com_p). The input reference for the velocity includes: a differential velocity obtained based on the distance from the gravity center of the robot to the center of the connecting line of the driving wheels projected on the ground (for example, identified with state_com_v), and a linear velocity of the wheels (identified with wheel_x_v), wherein the differential velocity refers to the velocity obtained by performing differential calculation on the distance. The above PD control law may take state_com_p, state_com_v and wheel_x_v as input states to calculate the reference acceleration or the reference torque of the driving wheel.

For another example, by taking the robot described in FIG. 1 to FIG. 3 as an example, the input reference for the posture may also include: an equivalent inclination angle of the base part. The equivalent inclination angle theta_equi may be calculated by using state comp and a mass center height. For example, theta_equi=atan(state_com_p/height). The input reference for the velocity includes: an equivalent inclination angle acceleration theta_dot_equi. The equivalent inclination angle may be calculated by using state_com_v and the mass center height. For example, theta_dot_equi=state_com_v/height. The above PD control law may use the equivalent inclination angle and the equivalent inclination angle acceleration to calculate the reference acceleration or the reference torque of the driving wheel.

In another aspect, this disclosure provides a robot. The robot includes: a wheel-legged part; a base part connected to the wheel-legged part, wherein the wheel-legged part and the base part include a plurality of joints; and a controller, the controller being arranged on the robot and being capable of performing the above robot control method.

In an example, by combining the whole-body dynamic technology, the embodiment of this disclosure provides a whole-body dynamic control method based on adaptive dynamic planning. The whole-body dynamic control method takes an output of a controller of a joint of the robot calculated based on the adaptive dynamic planning as a reference parameter of the whole-body dynamic control, so that the controller of the joint can cooperate with controllers of other joints, thereby improving the overall flexibility of the motion of the robot.

Thus, the embodiment of this disclosure may combine the whole-body dynamic technology, and take the output of the controller of the joint of the robot calculated based on the adaptive dynamic planning as the reference parameter of the whole-body dynamic control, so that the controller of the joint can cooperate with the controllers of other joints, thereby improving the overall flexibility of the motion of the robot.

According to an aspect of this disclosure, by combining the optimal control technology, the embodiment of this disclosure provides a policy iteration method based on adaptive dynamic planning.

Figures 5A, 5B:
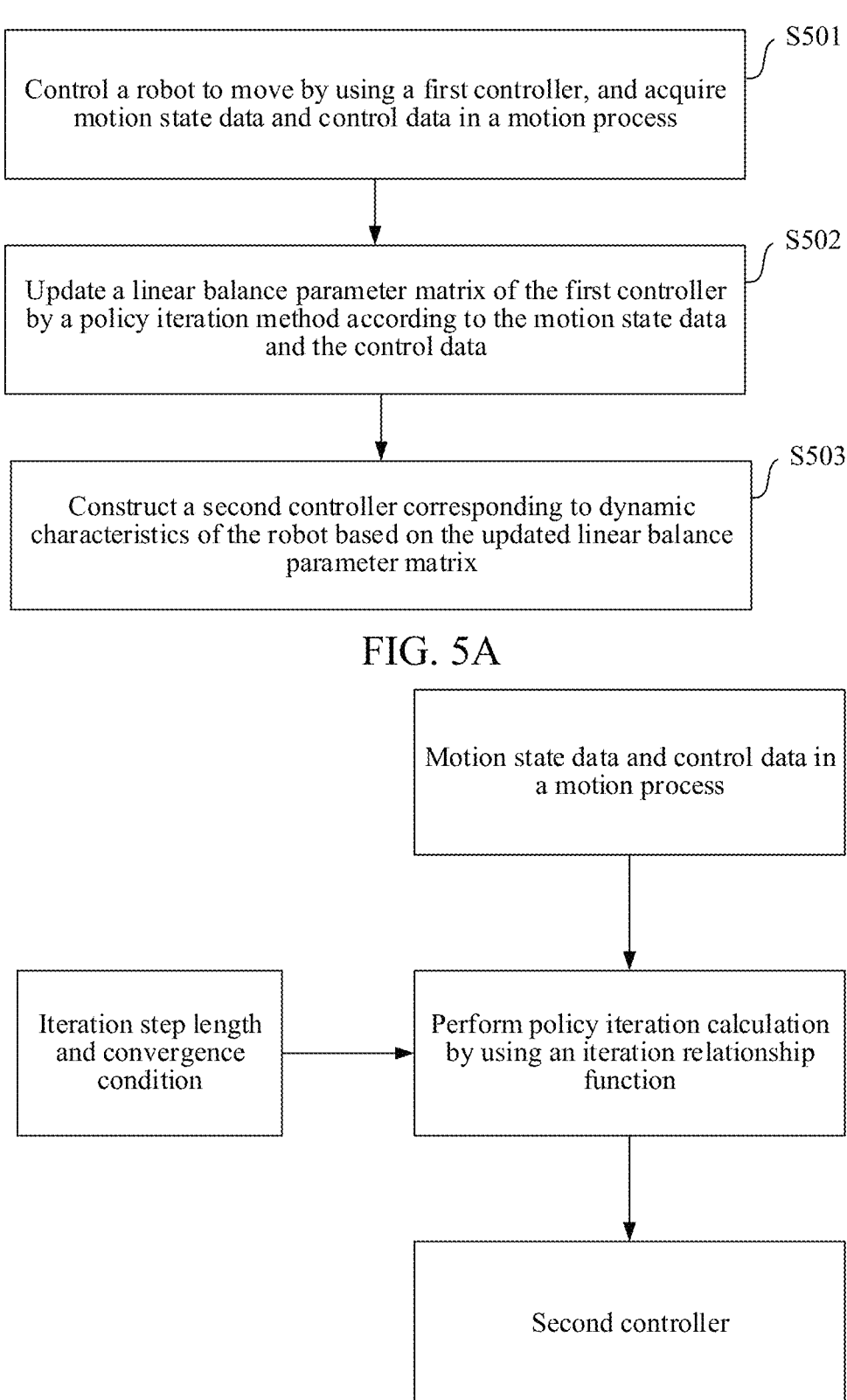
FIG. 5A is an exemplary flowchart of a robot control method according to an embodiment of this disclosure.
FIG. 5B is another exemplary flowchart of a robot control method according to an embodiment of this disclosure.

FIG. 5A and FIG. 5B show an exemplary flowchart of a process of updating a controller for performing a robot control method according to an embodiment of this disclosure. The robot control method is described more specifically below in combination with FIG. 5A to FIG. 5B. For example, the robot may be a robot 100 shown in FIG. 1 to FIG. 4. The schemes shown in FIG. 5A to FIG. 5B may be performed on-line or off-line. This disclosure is not limited to this.

Referring to FIG. 5A, the controller performing the robot control method may be a first controller. Step S501: Control the robot to move by using the first controller, and acquire motion state data and control data in the motion process. For example, accurate dynamic characteristics of the robot are unknown, or only some dynamic characteristics of the robot can be determined roughly. In addition, the dynamic characteristics of the robot may involve some variable parameters. By taking the robot 100 as an example, along with the motion of the robot 100, the height of the gravity center of the robot 100 may be changed. In addition, in a case where the robot 100 is used for carrying an object, the mass of the robot 100 may also be changed correspondingly. Either the change of the height of the gravity center or the change of the mass may lead to the change of characteristics such as kinetic energy, potential energy, momentum and the like of the robot in the motion process, thereby leading to the change of a corresponding dynamic model of the robot 100. Although this disclosure is described only by taking the height of the gravity core and mass serving as variable parameters as an example, a person skilled in the art may understand that this disclosure is not limited to this.

In an example, the linear balance parameter matrix of the first controller is a stable initial gain matrix. A control force provided by the controller at a moment may be negatively related to a product between the linear balance parameter matrix and the motion state data of the robot at the moment. For example, the controller may have a form of u(t)=−Kx(t), where K is the linear balance parameter matrix corresponding to the robot, u(t) is a control force/torque outputted by the controller at the moment t, and x(t) is the motion state data corresponding to the robot at the moment t. By taking the robot 100 described in FIG. 1 to FIG. 4 as an example, the robot 100 at least includes: a wheel-legged part including a plurality of joints, a base part connected to the wheel-legged part, and a driving motor for controlling the driving wheel in the wheel-legged part. Correspondingly, the motion data includes: a pitch angle of the base part, a velocity of the pitch angle of the base part, and a linear velocity of the driving wheel. The control data includes: an output torque of the driving motor. Correspondingly, since both the motion data and the control data may be acquired discretely by relevant measuring instruments, both the motion data and the control data correspond to a plurality of discrete consecutive moments or correspond to a plurality of consecutive time intervals.

In an example, the first controller is a non-optimal controller. The non-optimal controller, for example, is a controller that can only enable the robot 100 to stumble along the target trajectory. For example, the first controller as the non-optimal controller may be the controller corresponding to the simplified dynamic characteristic. For example, for the accurate dynamic model corresponding to the complicated wheel-legged robot, the dynamic model may be simplified as an equivalent dynamic model only composed of the driving wheel and the base part in an example.

As an example, the first controller may be used for controlling the robot to move in a quasi-balanced state. For example, under the control of some first controllers, the robot may swing around a balance point at a certain amplitude. For example, in a case where the robot with unknown dynamic characteristics is controlled by the first controller to move in the quasi-balanced state, the output of the first controller may be used as the control data. In a case where an experimenter uses a remote controller to control the robot to move, the control data may be obtained by acquiring the output of the controller (for example, detecting a driving force of the driving wheel) on a real robot. This disclosure does not limit a method for acquiring the control data.

As an example, one or more first controllers obtained by using a value iteration scheme described in detail below may also be used for controlling the robot to move. For example, in response to that a variable parameter is a first value, the value iteration scheme may be used for determining (such as off-line) the first controller. For example, the variable parameter is a height of the robot. The first value is 0.38 m, and a second value is 0.5 m. When the height of the robot 100 is 0.38 m, the value iteration scheme may be used for determining the optimal controller controlling the robot to travel in a straight line, and the controller is used as the first controller. The height of the robot 100 is regulated to 0.5 m by changing the angle of the joint. The first controller is continuously used for controlling the robot with the increased height to travel for a period of time or a distance, and the motion data and control data are acquired correspondingly. The motion data and the control data are subsequently used as training data of a second controller so as to obtain the optimal controller in a case where the variable parameter is the second value.

A person skilled in the art may understand that both the first value and the second value are merely examples. This disclosure is not limited to this. Although the value iteration scheme can determine the first controller adaptive to the robot with the height of 0.38 m, in a case where the body of the robot is changed, it may be necessary to off-line re-calculate the second controller adapted to the robot after the height change. The off-line calculation may be time-consuming, and may cause the interruption of the motion of the robot.

In order to reduce the calculation amount, step S502 to step S503 may be used for constructing the second controller by using a policy iteration scheme. For example, in step S502 a linear balance parameter matrix of the first controller is updated by a policy iteration method according to the motion state data and the control data. In step S503, the second controller corresponding to the dynamic characteristics of the robot is constructed based on the updated linear balance parameter matrix.

For example, compared with the robot controlled by the first controller, the robot controlled by the second controller may have better control effect in the motion process. For example, the left-right swinging amplitude of the robot controlled by the second controller corresponding to the dynamic characteristics of the robot at the balance point may be smaller compared with the robot controlled by the first controller. In another example, compared with the robot controlled by the first controller, the robot controlled by the controller may converge quickly nearby the balance point in the motion process, or the vibration of the robot is smaller, or the control velocity is higher, or overshoot is smaller, or a steady-state error is smaller, and the like. Or, in some cases, any controller has the same control effect as the controller, but the control input of the controller is smaller. This disclosure is not limited to this.

The traveling robot 100 is taken as an example for description. The robot 100 in a balanced state may be in a stable balanced state in the linear motion dimension and the rotational motion dimension. For example, the robot 100 in the balanced state can be kept in the same/similar state as being defined by the balance point in the motion process, or can be restored to the state defined by the balance point with maximum velocity/minimum energy consumption in the motion process. The state defined by the balance point may be the state of the robot 100 in which the pitch angle is zero, an angular velocity corresponding to the pitch angle is zero, and the linear velocity is the target velocity. For example, the posture of the robot 100 at the moment is in a straight-up state, and the robot 100 at the moment does not have the velocity in the rotational motion dimension but only has the target velocity in the linear motion dimension.

The robot 100 in the quasi-balanced state is in a state defined nearby the balance point in the motion process. For example, the robot may be in an intermediate state from the steady balanced state to the unstable balanced state in the linear motion dimension and the rotational motion dimension. The robot 100 in the quasi-balanced state may need the driving wheel to provide the large force and torque in the motion process to improve and/or ensure the robot not to fall. For example, the robot 100 at the moment may tilt left and right, and the robot 100 at the moment not only has the velocity in the linear motion dimension, but also has the velocity in the rotational motion dimension. It is to be noted that the robot 100 in the quasi-balanced state may also be in a state close to the unstable balanced state in the linear motion dimension or the rotational motion dimension at a certain moment during the motion, as long as the robot can be restored to the normal marching state by using the driving force of the driving wheel 104.

As an example, in a case where the robot 100 moves in a straight line only under the control of the driving wheel 104, the robot 100 in the balanced state can be always kept at the straight-up posture to travel in the straight line at a constant velocity, that is, a central axis of the base part of the robot 100 in the unstable balanced state can be always perpendicular to a horizontal line and does not have the velocity/acceleration in the rotational motion dimension. The base part of the robot 100 in the quasi-balanced state may have an inclination angle (pitch angle), and have the velocity/acceleration in the rotational motion dimension.

In the embodiment of this disclosure, the robot may be first controlled by the first controller to travel for a period of time or trajectory, and the motion state data and control data corresponding to the period of time or trajectory is acquired as the training data. Even in a case where the dynamic characteristics of the robot 100 are unknown or inaccurate or the dynamic characteristics are changed in the motion process, and the first controller is the non-optimal controller, the embodiment of this disclosure can also determine the second controller as the optimal controller correspondingly by using the policy iteration. The embodiment of this disclosure uses the value-driven policy iteration scheme to calculate the linear balance parameter matrix so as to construct the controller. The control effect of the controller is better than the non-optimal controller, or better than the control effect of the first controller in some cases.

The constructed controller can converge to the controller corresponding to an optimal solution of a linear quadratic regulation problem. The controller corresponding to the optimal solution of the linear quadratic regulation problem is the controller corresponding to the accurate dynamic characteristics of the robot. The controller corresponding to the optimal solution of the linear quadratic regulation problem can minimize a cost functional of the robot in the motion process, so that the robot travels along the target trajectory with the optimal control effect in the balanced state. The policy iteration scheme and a calculation scheme of the linear balance parameter matrix may be further described below.

Thus, the quantity of the training data in the embodiment of this disclosure may be far less than the data volume required in the traditional reinforcement learning algorithm. Further, the trained controller in the embodiment of this disclosure gradually converges to the controller corresponding to the optimal solution of the linear quadratic regulation problem with the increase of a learning step length, so that the stability of the closed-loop system may be improved and/or ensured, and the training process can be greatly simplified. Moreover, the training data does not need to be limited additionally, so that a design process of the controller of the wheel-legged robot is simplified. In addition, the embodiment of this disclosure may perform data acquisition directly on the real robot, and the trained controller is directly applied to the real robot. The embodiment of this disclosure does not need to perform data acquisition in an emulator based on a physical engine, so that problems brought by migrating the data from a virtual world to a real world are omitted.

Embodiments of this disclosure include a method for controlling the robot. For example, the method includes: a motion instruction is received, the motion instruction indicating a motion trajectory of the robot; a driving force of a driving wheel is controlled according to the motion instruction, so that the robot moves under the control of the first controller, and motion state data and control data are acquired in the motion process; and a second controller corresponding to dynamic characteristics of the robot is constructed by a policy iteration method based on the motion state data and the control data, and the driving force of the driving wheel is controlled by the second controller to make the robot move stably. Compared with the robot controlled by any other controller, the robot under the control of the controller has better control effect in the motion process, for example, closer to the balance point.

The method for controlling the robot according to the embodiment of this disclosure can enable the robot with unknown dynamic characteristics to learn the data in the motion process, and gradually improves/generates the controller corresponding to the dynamic characteristics of the robot, so that the stable motion can be finally realized. Since the robot may be controlled by the control input of the first controller to move for a period of time so as to obtain the training data, in this case, the embodiment of this disclosure can help realize the improvement on the non-optimal controller in a case of unknown dynamic characteristics or change of the dynamic characteristics, and generates the second controller corresponding to the (accurate) dynamic characteristics of the robot. That is, the embodiment of this disclosure may enable the robot to be controlled flexibly without the accurate dynamic model.

For example, further referring to an example of FIG. 5B, the motion process of the robot 100 may be regarded as a consecutive time linear system on mathematics. It is assumed that the robot 100 has the controller corresponding to the optimal solution of the linear quadric regulation problem, which can minimize the cost functional corresponding to the motion process of the robot. For example, the controller corresponding to the optimal solution of the linear quadric regulation problem can minimize the cost that the robot is located nearby the balance point and can enable the robot to travel along the target trajectory with minimal energy consumption.

As an example, the linear quadric regulation problem may be defined by formula (7), which indicates that the controller that can minimize the cost functional J of the consecutive time linear system is solved in a case of $\dot{x}=Ax+Bu$. Similarly, $A \in \mathbb{R}^{n \times n}$, and $B \in \mathbb{R}^{n \times 1}$.

$$\min J = \int_0^\infty x^T(t)Qx(t) + Ru^2(t)dt \qquad (7)$$

$$\text{s.t. } \dot{x} = Ax + Bu,$$

Where J is the cost functional of the consecutive time linear system, and Q is a real symmetric and positive semidefinite matrix, $Q \in \mathbb{R}^{n_p \times n_p}$. $(A, \sqrt{Q})$ is observable, and R>0. x is related to the robot configuration and the wheel balance task. For example, referring to the example in FIG. 4, in a case where the controller of the driving wheel needs to be determined, x may include the pitch angle, the angular velocity of the pitch angle and the linear velocity of the robot, and u is a sum of input torques of the two wheels.

According to an optimal control theory, an Algebraic Riccati equation (formula (8)) on mathematics may be used as the solution of the following linear quadric regulation (LQR) defined by formula (7).

$$A^T P^* + P^* A - \frac{1}{r} P^* BB^T P^* + Q = 0 \qquad (8)$$

where u*(t) is the controller corresponding to the optimal solution of the linear quadric regulation problem, $$u^*(t) = -K^* x(t), \text{ where } K^* = \frac{1}{R} B^T P^*,$$

and P* is the matrix satisfying $$A^T P^* + P^* A - \frac{1}{R} P^* BB^T P^* + Q = 0.$$

In a case that the accurate dynamic characteristics of the robot 100 are known, the matrices A and B in formula (7) and formula (8) are known. In a case where the matrices A and B of formula (7) and formula (8) are known, u*(t) can be correspondingly solved.

However, as described above, in a case where the accurate dynamic characteristics of the robot 100 are unknown, or only some dynamic characteristics of the robot 100 can be determined, the above optimal controller u*(t)=−K*x(t) cannot be determined in the practical application. Further, P in formula (7) and formula (8) is nonlinear, so that it may be difficult to calculate the accurate P*.

In various aspects of the disclosure, in a case where the accurate dynamic characteristics of the robot 100 are unknown or the variable parameters in the dynamic characteristics are changed, or in a case where only some dynamic characteristics of the robot 100 can be determined, the above optimal controller u*(t)=−K*x(t) is determined by using the policy iteration scheme. According to relevant theories of the policy iteration, it may correspondingly determine that:

assuming that there is $K_0 \in \mathbb{R}^{1 \times n}$, $K_0$ is a stable control gain matrix. That is, A−BK$_0$ is Hurwitz. In a case where $K_k$ is continuously updated by using formula (9), in response to that k is approximate to positive infinity, $K_k$ is approximate to K*, that is, $\lim_{k \to \infty} K_k = K^*$.

$$K_{k+1} = \frac{1}{R} B^T P_k \qquad (9)$$

In formula (9), $P_k > 0$, and $P_k$ is a solution of a Lyapunov equation. For an example of the Lyapunov equation, refer to formula (10).

$$A_k^T P_k + P_k A_k + K_k^T R K_k + Q = 0 \qquad (10)$$

In formula (9) and formula (10), k=0,1,2, . . . , and $A_k = A - BK_k$. Similar to $K_k$, $\lim_{k \to \infty} P_k = P^*$. Thus, formula (9) and formula (10) describe a relationship among $K_{k+1}$, $K_k$ and $P_k$.

Thus, at least partially based on formula (9) and formula (10), a scheme for updating the linear balance parameter matrix of the first controller by using the policy iteration method in step S502 may be determined exemplarily.

For example, step S502 may further include: the motion state data and control data corresponding to a plurality of time intervals are nonlinearly combined to determine a training data set, and an iteration relationship function is determined based on the training data set; and multiple policy iterations are performed on an iteration target according to the iteration relationship function to approximately obtain the linear balance parameter matrix corresponding to the dynamic characteristics of the robot.

Step S502 is described below with the example described in FIG. 1 to FIG. 4. According to the description of FIG. 1 to FIG. 4, the first controller $u_0$ may be used for controlling the robot to move, and the motion state data and control data corresponding to a plurality of time intervals are acquired correspondingly. For example, for the control policy u=u$_0$, the closed-loop system may be expressed with formula (11).

$$\dot{x} = Ax + Bu_0 \qquad (11)$$

Through formula (9) and formula (10), along the trajectory defined by formula (11), a time derivative of $x(t)^T P_k x(t)$ may be exemplarily shown by formula (12).

$$\frac{d}{dt}\left(x(t)^T P_k x(t)\right) = x(t)^T \left(A^T P_k + P_k A\right)x(t) + 2u_0 B^T P_k x(t) \qquad (12)$$

$$= x(t)^T \left(A_k^T P_k + P_k A_k\right)x(t) + 2(K_k x(t) + u_0)B^T P_k x(t)$$

$$= -x(t)^T \left(Q + K_k^T R K_k\right)x(t) + 2(K_k x(t) + u_0)R K_{k+1} x(t)$$

$$= -x(t)^T Q_k x(t) + 2(K_k x(t) + u_0)R K_{k+1} x(t)$$

where $Q_k = Q + K_k^T R K_k$.

Further, the motion state data is acquired by a sensor at a certain time interval in a period of time, and respectively corresponds to the motion state of the robot at each discrete moment in a period of time. Therefore, the motion state data and the control data of the first controller may correspond to a plurality of time intervals in $[t_0, t_r]$. Any time interval t to $t+\delta t$ in the plurality of time intervals may be written as $[t, t+\delta t]$, and a duration $\delta t$ may be determined according to a data acquisition time interval that can be reached by the robot sensor.

Referring to FIG. 5B, the motion state data and control data corresponding to a plurality of time intervals may be combined nonlinearly so as to be used for constructing the iteration relationship function. The motion state data and the control data after integral operation are used as training data for participating in a policy iteration process for the iteration target item in step S502 so as to approximately obtain the linear balance parameter matrix corresponding to the dynamic characteristics of the robot. It is to be noted that the following description is only an exemplary integral operation. This disclosure is not limited to this.

For example, the exemplary formula (13) may be determined by taking integrals of both sides of formula (12) in the time interval $[t, t+\delta t]$, and re-arranging the formula (12).

$$x(t+\delta t)^T P_k x(t+\delta t) - x(t)^T P_k x(t) - 2\int_t^{t+\delta t}(K_k x(t) + u_0)RK_{k+1}x d\tau = \tag{13}$$

$$-\int_t^{t+\delta t} x(t)^T Q_k x(t) d\tau.$$

In order to determine variables $P_k$ and $K_{k+1}$, formula (13) may be iterated in multiple time intervals. For example, by specifying r to be a large-enough integer, for all $i=0, 1, \ldots, r-1$, $\delta t \leq t_{i+1} - t_i$.

It may be seen from formula (13) that the time integral of the motion state data between any two adjacent moments t and $t+\delta t$ may be related to at least one of the following items: a quadratic term of the motion state data of moment t, a quadratic term of the motion state data of moment $t+\delta t$, a product between the motion state data of the moment t and the motion state data of the moment $t+\delta t$, a product between the control data of the moment t and the motion state data of the moment t, a product between the control data of the moment $t+\delta t$ and the motion state data of the moment $t+\delta t$, and the like. In an example, the control data of the moment t is the control data controlling the robot to travel by using the first controller.

In order to further describe the policy iteration process, for the given integer r, the embodiment of this disclosure may define the following three matrices as exemplary elements in the training data set by using formula (14), i.e. first matrix $\Delta_{xx}$, second matrix $\Sigma_{xx}$, and third matrix $\Sigma_{xu}$. The first matrix $\Delta_{xx} \in \mathbb{R}^{r \times n^2}$, the second matrix $\Sigma_{xx} \in \mathbb{R}^{r \times n^2}$, and $\Sigma_{xu} \in \mathbb{R}^{r \times n}$. Each matrix corresponds to the nonlinear combination of the motion state data and control data in multiple time intervals, for example, involving the integral operation, product calculation, and the like.

$$\Delta_{xx} = \left[ x \otimes x\big|_{t_0}^{t_0+\delta t}, x \otimes x\big|_{t_1}^{t_1+\delta t}, \ldots, x \otimes x\big|_{t_r}^{t_r+\delta t} \right]^T \tag{14}$$

$$\sum_{xx} = \left[ \int_0^{t_0+\delta t} x \otimes x d\tau, \int_{t_1}^{t_1+\delta t} x \otimes x d\tau, \ldots, \int_{t_r}^{t_r+\delta t} x \otimes x d\tau \right]$$

$$\sum_{xu} = \left[ \int_0^{t_0+\delta t} xu_0 d\tau, \int_{t_1}^{t_1+\delta t} xu_0 d\tau, \ldots, \int_{t_r}^{t_r+\delta t} xu_0 d\tau, \right]$$

where $0 \leq t_0 < t_1 < \ldots < t_r$. The operator indicates a Kronecker product.

For example, for the robot 100 described in FIG. 1 to FIG. 4, any element $$x \otimes x\big|_{t_i}^{t_i+\delta t}$$

in the first matrix $\Delta_{xx}$ corresponds to a product of any two items or a difference of quadratic terms of any one of the pitch angle of the base part, the angular velocity of the pitch angle of the base part and the linear velocity of the driving wheel at the moment $t_i$ and the moment $t_i+\delta_t$. Any element $$\int_{t_i}^{t_i+\delta t} x \otimes x d\tau$$

in the second matrix $\tau_{xx}$ corresponds to a product of any two items or a product of quadratic terms of any one of the pitch angle of the base part, the angular velocity of the pitch angle of the base part and the linear velocity of the driving wheel at the moment $t_i$ and the moment $t_i+\delta_t$. Any element $$\int_{t_i}^{t_i+\delta t} xu_0 d\tau$$

in the third matrix $\Sigma_{xu}$ corresponds to an integral of a product between any one of the pitch angle of the base part, the angular velocity of the pitch angle of the base part and the linear velocity of the driving wheel at the moment $t_i$ and the moment $t_i+\delta_t$ and the driving force controlled by the first controller. The configurations of different robots may correspond to different matrices. The above is only used as an example. This disclosure is not limited to this.

For different t, for example, $t=t_0, t_1, \ldots, t_r$, an equation set of formula (13) may be exemplarily written in a form of formula (15). A person skilled in the art may understand that different linear combination manners of the training data may correspondingly affect the form of the constructed iteration relationship function. The iteration relationship function (such as formula (15)) obtained based on formula (13) is shown exemplarily below, where the iteration target item includes the to-be-iterated linear balance parameter matrix, and a solution of the Lyapunov equation with the to-be-iterated linear balance parameter matrix as a parameter. This disclosure is not limited to this.

$$\Omega_k \left[ \begin{array}{c} vec(P_k) \\ vec(K_{k+1}) \end{array} \right] = \Xi_k \tag{15}$$

where $vec(\cdot)$ identifies vectorization of contents in brackets. In addition, $\Omega_k \in \mathbb{R}^{r \times (n^2+n)}$, and $\Theta_k \in \mathbb{R}^r$ may be defined as the form shown in formula (16). As described above, k indicates the number of policy iterations, $P_k$ is the solution of the Lyapunov equation in the $k^{th}$ policy iteration, $K_k$ is the linear balance parameter matrix used in the $k^{th}$ policy iteration, and $K_{k+1}$ is the linear balance parameter matrix in the $(k+1)^{th}$ policy iteration.

$$\Omega_k = \left[ \Delta_{xx}, -2\sum_{xx}\left( I_n \otimes K_k^T R \right) - 2\sum_{xu}(I_n R) \right] \tag{16}$$

$$\Xi_k = -\sum_{xx} vec(Q_k).$$

In a transformation process from formula (13) to formula (15), in order to simplify the calculation, it may let $x^T Mx = x \otimes xvec(M)$.

Thus, by updating $K_k$ in formula (16) to be $K_{k+1}$ in formula (15), the policy iteration scheme makes the generation of the optimal controller no longer depend on the model information (A, B). In addition, formula (16) may also collect the data that is acquired on-line, and the control policy is updated from $K_K$ to $K_{k+1}$ by using formula (15). Therefore, the data collected in formula (16) may be reused so as to use the formula (15) for updating $k=0,1, \ldots, 1$ to be $K_k$, and the updating process may be performed on-line or off-line. Therefore, the policy iteration process may also be referred to as off-policy iteration.

In addition, in order to improve and/or ensure the existence of an exclusive pair $(P_k, K_{k+1})$ to meet the requirement of formula (15), it is also necessary to satisfy a rank condition defined by formula (17).

$$\text{rank}([\Sigma_{xx} \ \Sigma_{xu}])=n(n+3)/2 \qquad (17)$$

It may be seen from $\lim_{k \to \infty} P_k = P^*$ that in a case where a difference between the solutions $P_k$ and $P_{k+1}$ of the Lyapunov equation corresponding to two adjacent policy iterations is less than a preset value (such as a very small value), the iteration target item is converged, and the policy iteration is ended.

Figures 6, 7A:
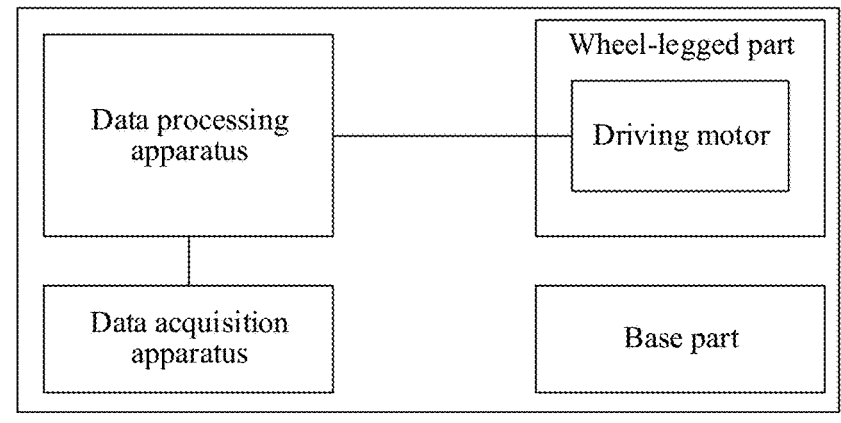
FIG. 6 is another structural view of a robot according to an embodiment of this disclosure.
FIG. 7A shows motion state data and control data of a robot in a process that a robot is controlled by a first controller to move according to an embodiment of this disclosure.

A method for controlling the robot shown in FIG. 1 to FIG. 4 is further described below with reference to FIG. 6 to FIG. 7B. FIG. 6 is another structural view of the robot 100. FIG. 7A shows the motion state data and the control data in the motion process of the robot controlled by the first controller. FIG. 7B shows a convergence process of the linear balance parameter matrix in a process of constructing the controller corresponding to the dynamic characteristics of the robot, where a height of the base part of the robot is 0.5 m and 0.6 m respectively. FIG. 7C shows the motion state data that the robot is controlled respectively by the first controller and the second controller to travel in the straight line in a case where the height of the base part is 0.6 m.

As shown in FIG. 6, besides the wheel-legged part and the base part described in FIG. 1 to FIG. 4, the robot 100 also includes a data acquisition apparatus, a data processing apparatus and a driving motor.

The data acquisition apparatus may be configured $t_0$: acquire the motion state data and the control data of the robot in the motion process in a case where the robot is controlled by the first controller to move. For example, the data acquisition apparatus may include: a first sensor, configured to measure a pitch angle $\theta$ of the base part and an angular velocity $\dot{\theta}$ of the pitch angle of the base part; and a second sensor, configured to measure a rotational angular velocity $\dot{\phi}l$ and $\dot{\phi}r$ of a left driving wheel and a right driving wheel. The first sensor may be an inertial measurement unit (IMU), which may include a three-axis gyroscope, a three-axis accelerometer, or a three-axis magnetometer. The second sensor may be a motor encoder with a sampling frequency of 200 Hz.

The data processing apparatus is configured $t_0$: update the linear balance parameter matrix of the first controller by a policy iteration method according to the motion state data and the control data; and construct the second controller corresponding to the dynamic characteristics of the robot based on the updated linear balance parameter matrix.

For example, the data processing apparatus may be further configured to further process the data acquired by the data acquisition apparatus. For example, based on the rotational angular velocity $\dot{\phi}l$ and $\dot{\phi}r$ of the left driving wheel and the right driving wheel, the data processing apparatus may calculate a linear velocity $$\dot{x} = \frac{\dot{\phi}_l + \dot{\phi}_r}{2} r_w$$

of the robot 100, where $r_w$ is a radius of the driving wheel. In an example, rw=0.1. In an example, the data processing apparatus may also calculate a yawing velocity $$\dot{\psi} = \frac{\dot{\phi}_r - \dot{\phi}_l}{w_d} r_w$$

of the robot, where $w_d$ is a width of the robot, and in an example $w_d=0.47$ m.

For convenience in description, this disclosure only gives an example of controlling the driving wheel 104 by the first controller or the second controller. A person skilled in the art may understand that the scheme of this disclosure may also be used for controlling other components of the robot. Since the driving wheel is only used for controlling the forward and backward motion of the robot, for a curved target trajectory, a controller for controlling a yawing angle is also needed for controlling the steering of the robot. In order to simplify the description, the controller controlling the yawing angle is set as $\tau\psi=0.3(\dot{\psi}-\dot{\psi}d)$, where $\dot{\psi}_d$ is a target yawing velocity. Then the torques of the left and right wheels are calculated by $$\tau_l = \frac{ur_w}{2} + \tau_\psi \text{ and } \tau_r = \frac{ur_w}{2} - \tau_\psi. \text{ Because } \frac{\tau_l + \tau_f}{r_w} = u,$$

$\tau_\psi$ does not change a longitudinal force of the robot. Therefore, the yawing motion may not affect the balance of the robot. The angle unit is converted to be "degree (deg)" for facilitating the reading.

The data processing apparatus calculates the control data of the first controller based on the given target trajectory. For convenience in description, the controller $u_0$ of the linear balance parameter matrix $K=K_0=[-81.99, -34.96, -16.38]$ serving as the first controller is taken as an example for description. The first controller is the optimal controller that can control the robot 100 to travel upright and is obtained by a value iteration method in response to the minimal height of the robot. In an example, the minimal height of the robot is 0.33 m. Further, a control frequency of the data processing apparatus is 1000 Hz for example.

As described above, the motion data and the control data may be used for calculating the first matrix $\Delta_{xx}$, the second matrix $\Sigma_{xx}$, and the third matrix $\Sigma_{xu}$. The data needs a consecutive signal of x and u. Therefore, in a case where the first controller and the controller corresponding to the dynamic characteristics of the robot control the robot 100 to move, the data processing apparatus may be further configured to calculate the integral by using the trapezoidal integral. A step length of the trapezoidal integral is 0.01 s, which is the same as a sampling period.

As shown in FIG. 7A, the height of the robot may be increased to 0.5 m, the first controller (with the linear balance parameter matrix $K=k_0=[-81.99, -34.96, -16.38]$) is used for controlling the robot to travel for 5 s by superimposing exploration noise $\beta(t)$, and the yawing angle, the yawing velocity, the linear velocity and the torque of the driving wheel are acquired correspondingly. In an example, the exploration noise is usually used in the fields of learning and system recognition. The exploration noise may trigger various system behaviors to avoid the repeated data acquisition. As an example, the exploration noise $\beta(t)=\sin(10\pi t)+0.4\cos(6\pi t)$.

As shown in an upper diagram of FIG. 7B, the linear balance parameter matrix gradually converges to K=[−99.58 −35.87 −5.18]. As shown in a left diagram of FIG. 7B, $|P_{K+1}-P_k|<\varepsilon=10^{-5}$ may be achieved only by 37 iterations.

Similarly, the embodiment of this disclosure also adopts u=−Kx as the first controller (where K0=[−99.58 −35.87 −5.18]), and then the height of the robot is increased to 0.6 for performing a group of similar experiments. As shown in a lower diagram of FIG. 7B, the linear balance parameter matrix converges to K=[−109.64, −34.08, −11.58]. As shown in the lower diagram of FIG. 7B, $|P_{K+1}-P_k|<\varepsilon=10^{-5}$ may be achieved only by 47 iterations. The convergence velocity of the policy iteration can be very high, so that the embodiment of this disclosure can be applied to the on-line calculation.

FIG. 7C further shows comparison between control effects of the first controller $u_0(t)=-K_0x(t)$ (where $K_0=[-81.99, -34.96, -16.38]$) and the second controller $u(t)=-K_1x(t)$ (where $K_1=[-109.64, -34.08, -11.58]$). In the comparison experiment, the same sinusoidal noise is added to the first controller $u_0$ (t) and the second controller u(t) to simulate the external disturbance acting on the wheel. As shown in the upper diagram and lower diagram of FIG. 7C, two controllers are robust to the noise, and have the same control performance. However, as indicated by a small amplitude of the second controller in the lower diagram of FIG. 7C, the control effect of the updated gain K1 is better in the regulation of the pitch angular velocity $\dot{\theta}$, so that the travel state of the robot is more stable.

In combination of the optimal control technology, the embodiment of this disclosure provides a value iteration method based on adaptive dynamic planning. The value iteration method based on the adaptive dynamic planning can calculate the controller converging to the dynamic characteristics of the robot without knowing the dynamic characteristics of the robot. The controller corresponding to the accurate dynamic characteristics of the robot is the controller corresponding to the optimal solution of the linear quadratic regulation problem, which can make the robot travel along the target trajectory with the optimal control effect in the balanced state.

With reference to FIG. 8, the example of acquiring the controller corresponding to the dynamic characteristics of the robot is further described below. FIG. 8 is a flowchart of a value iteration scheme according to an embodiment of this disclosure.

First, the motion process of the robot 100 may be regarded as a consecutive time linear system on mathematics. It is assumed that the robot 100 has the controller corresponding to the optimal solution of the linear quadratic regulation problem, which can minimize the cost functional corresponding to the motion process of the robot. For example, the controller corresponding to the optimal solution of the linear quadratic regulation problem can minimize the cost that the robot is located nearby a balance point and can enable the robot to travel along the target trajectory with minimal energy consumption.

As an example, as described above, formula (7) and formula (8) are already illustrated. In a case that the accurate dynamic characteristics of the robot 100 are known, the matrices A and B in formula (7) and formula (8) are known. In a case where the matrices A and B of formula (7) and formula (8) are known, u*(t) can be correspondingly solved.

However, as described above, in a case where the accurate dynamic characteristics of the robot 100 are unknown, or only some dynamic characteristics of the robot 100 can be determined, the above optimal controller u*(t)=−K*x(t) cannot be determined in the practical application. Further, P in formula (7) and formula (8) is nonlinear, so that it may be difficult to calculate the accurate P*.

As described above, according to LQR-related theories and value iteration-related theories, for formula (7) and formula (8), in a case where (A, B) may be stable, and $(A, \sqrt{Q})$ is observable, for any S≥0, $\lim_{s\to-\infty}P(s)=P^*$, where P(s) is a solution of the following differential Riccati equation (formula (18)), and P* is a solution of formula (8).

$$-\frac{dP(s)}{ds} = A^T P(s) + P(s)A - \frac{1}{R}P(s)BB^T P(s) + Q \tag{18}$$

$$P(t_f) = S$$

That is, in a case where S is approximate to negative infinity, P(s) may converge to P*.

Based on the above theories, the embodiment of this disclosure shows a construction process of the first controller for performing the robot control method, which may include step S801 to step S803.

In step S801, the robot is controlled to move, and the motion state data and control data in a motion process is acquired, diversity measures of the motion state data and control data being greater than a predetermined threshold.

For example, the robot may be controlled to move along a predetermined trajectory, and the motion state data and control data in the motion process may be acquired. The predetermined trajectory may be roughly estimated based on structural characteristics, motion characteristics and power characteristics of the robot so as to acquire the motion data of the robot in various motion situations (scenarios), so that the diversity measures of the motion state data and control data are high enough (for example, at least greater than the predetermined threshold). In an example, the diversify measure may be represented by information entropy, which represents that the motion state data and control data both have sufficient values that are not repeated/not the same. In another example, the diversity measure may also be represented by a data characteristic quantity.

At this time, the robot may be controlled by any controller to move along the predetermined trajectory. For example, the robot may be controlled manually to move in the straight line at different accelerations no matter whether the robot is in a state of balanced and stable motion. For the robot shown in FIG. 1 to FIG. 4, in a case where the driving wheel 104 provides an excessively large acceleration, the robot 100 may fall backward quickly. In a case where the driving wheel 104 provides excessively small acceleration, the robot cannot arrive at the destination quickly and may tilt forward.

Therefore, in an example of this disclosure, the motion state data and control data satisfying the diversity measures may be acquired by the following methods.

As shown in FIG. 9, for example, a driving motor may be first controlled to output a first torque, so that the robot loses the balance due to low-velocity motion. For example, the first torque may be a small value, so that in a case where the driving motor is controlled to output the first torque, the mass center of the base part of the robot is first raised and then lowered, and the front end of the base part contacts the ground in response to that the robot loses the balance.

The driving motor may also be controlled to output a second torque, so that the robot loses the balance due to high-velocity motion. For example, the second torque may be a large value, so that in a case where the driving motor is controlled to output the second torque, the mass center of the base part of the robot is first raised and then lowered, and the rear end of the base part contacts the ground in response to that the robot loses the balance.

The driving motor may also be controlled to output a third torque, so that the robot keeps balanced for a period of time. In a case where the driving motor is controlled to output the third torque, the mass center of the base part of the robot is kept at a same height in a case where the robot keeps balanced. Or, the driving motor is controlled to output a fourth torque, so that the robot keeps a quasi-balanced state for a period of time, and the robot in the quasi-balanced state is located nearby a balance point in the motion process. In a case where the driving motor is controlled to output the fourth torque, the base part of the robot swings back and forth in a case where the robot keeps the quasi-balanced state.

In step S802, the linear balance parameter matrix is calculated by a value iteration method according to the motion state data and the control data. In step S803, the first controller corresponding to the dynamic characteristics of the robot is constructed based on the linear balance parameter matrix. Compared with the robot controlled by a remote controller, the robot controlled by the controller corresponding to the dynamic characteristics of the robot has better control effect in the motion process.

In an example, the controller corresponding to the dynamic characteristics of the robot is a linear controller. For each moment in the motion process, the controller corresponding to the dynamic characteristics of the robot provides the product between the linear balance parameter matrix that is negatively related to the required control torque and the motion state data of the robot.

For example, step S802 in FIG. 8 may further include: an integral operation is performed respectively on the motion state data and the control data corresponding to a plurality of time intervals, and an iteration relationship function is constructed; and value iteration is performed on an iteration target item according to the iteration relationship function to approximately obtain the linear balance parameter matrix corresponding to the dynamic characteristics of the robot. In an example, the linear balance parameter matrix K is $$\frac{1}{R}B^T P(s),$$

where s is approximate to negative infinity.

Step S802 is described below respectively with the examples described in FIG. 1 to FIG. 4. According to the description of FIG. 1 to FIG. 4, the motion state data for training and the control data for training may be obtained. In an example, the motion state data for training and the control data for training are the motion data and the control data at a moment before the falling of the robot (for example, the front end/rear end of the base part or the tail are not in contact with the ground). That is, at least in the motion process, based on formula (18), the following formula (19) is established.

$$\frac{d}{dt}\left(x(t)^T P(s)x(t)\right) = x(t)^T H(s)x(t) + 2u_0 RK(s)x(t) \qquad (19)$$

where $H(s) = A^T P(s) + P(s)A$ and $K(s) = \frac{1}{R}B^T P(s)$.

Further, the motion state data is acquired by the sensor at a certain time interval in a period of time, and respectively corresponds to the motion state of the robot at each discrete moment in a period of time. Therefore, the motion state data and the control data of the first controller may correspond to a plurality of time intervals in $[t_0, t_r]$. Any time interval $t_i$ to $t_{i+1}$ in the plurality of time intervals may be written as $[t, t+\delta t]$, and a duration $\delta t$ may be determined according to a data collection time interval that can be reached by the robot sensor.

Referring to FIG. 8, the integral operation may be performed respectively on the motion state data and the control data corresponding to a plurality of time intervals to construct the iteration relationship function. The motion state data and the control data after the integral operation are used as training data for participating in a value iteration process for an iteration target item so as to approximately obtain the linear balance parameter matrix corresponding to the dynamic characteristics of the robot. It is to be noted that the following description is only an exemplary integral operation. This disclosure is not limited to this.

For example, formula (20) may be obtained by taking the integrals on both sides of the formula (19) in the time interval $[t, t+\delta t]$ for different t, such as $t=t_0, t_1, \ldots, t_r$.

$$\tilde{\Omega}\begin{bmatrix} vec(H(s)) \\ vec(K(s)) \end{bmatrix} = \Delta_{xx}vec(P(s)) \qquad (20)$$

where $\tilde{\Omega}=[\Sigma_{xx}, 2\Sigma_{xu}(I_n R)]$. Expressions of $\Delta xx$, $\Sigma xx$ and $\Sigma xu$ are already shown in formula (14). Thus, by continuously and iteratively calculating the formula (20) and updating formula (18), in a case where the rank condition is satisfied and there is an exclusive pair of (H(s), P(s)), the linear balance parameter matrix K* can be generated by value iteration, and the whole process does not depend on the model information (A, B). That is, in a case where the iteration target item converges in the value iteration process, the value iteration may be stopped. According to the converged iteration target item, the linear balance parameter matrix corresponding to the dynamic characteristics of the robot is re-constructed.

As described above, according to the embodiment of this disclosure, by acquiring the motion state data and the control data of the robot with unknown dynamic characteristics before losing balance (falling), and by performing integral operation on the data, the first to the third matrices are constructed as the training data. Thus, the quantity of the training data in the embodiment of this disclosure is far less than the data volume required in the traditional reinforcement learning algorithm. According to the embodiment of this disclosure, the iteration relationship function (such as formula (20)) is constructed correspondingly, so that the target iteration item (such as P(s), K(s) and H(s)) converges gradually with the increase of a learning step length. Moreover, the converged target iteration item may obtain a controller. The controller converges to the controller corresponding to the optimal solution of the linear quadratic regulation problem, thereby improving and/or ensuring the stability of the closed-loop system, and greatly simplifying the training process. No additional limitation is needed for the training data in the whole process, so that the design process of the controller of the robot is simplified.

Similarly, as described above, besides the wheel-legged part and base part described in FIG. 1 to FIG. 4, the robot

100 also includes the data acquisition apparatus, the data processing apparatus and the driving motor shown in FIG. 6.

In an example using the value iteration scheme, the data acquisition apparatus may be configured $t_0$: acquire the motion state data of the robot.

The data processing apparatus is configured $t_0$: acquire the control data corresponding to the motion state data; calculate the linear balance parameter matrix by the data iteration method according to the motion state data and the control data, where diversity measures of the motion state data and the control data are greater than a predetermined threshold; and construct the controller corresponding to the dynamic characteristics of the robot based on the linear balance parameter matrix.

For example, the data processing apparatus may be further configured to further process the data acquired by the data acquisition apparatus. For convenience in description, this disclosure only gives an example of controlling the driving wheel 104. A person skilled in the art may understand that the scheme of this disclosure may also be used for controlling other components of the robot. The data processing apparatus sets the control data for training based on the given target trajectory. Just as shown in FIG. 3, this disclosure does not limit a specific control law of the controller for training. In order to illustrate the non-limitation of this disclosure for the controller for training, the following description may take an example that the experimenter manually controls the robot to move to extract the motion data and the control data. Further, the control frequency of the data processing apparatus is 1000 Hz for example.

As described above, the motion data and the control data may be used for calculating $\Delta xx$, $\Sigma xx$ and $\Sigma xu$. These data need a consecutive signal of x and u. The method the same as FIG. 7A is used for acquiring the motion data, for example, the data that an instruction may be inputted manually by a remote controller to determine that the remote controller controls the robot to move in a case of the height l=0.33 m of the base part of the robot 100. For example, the experimenter cannot accurately know the dynamic characteristics of the robot 100, and the controller of the robot cannot be accurately regulated timely in a case where the robot is manually controlled, resulting in falling of the robot.

The acquired motion state data may also be further processed so as to obtain the controller corresponding to the dynamic characteristics of the robot as soon as possible. For example, in the experiment, at least one motion data collector or motion data acquisition thread may be used for acquiring the motion state data in the motion process. Based on the acquisition time of the motion state data, the repeated motion state data is removed. For example, frequencies (imu frequency, control frequency, and data storage frequency) of different motion data collectors/threads may store the same data. Therefore, while the data is processed off-line by using the value iteration scheme or the policy iteration scheme, whether there is the same data is determined based on the time, and the repeated data is removed. Thus, the error of a main computer on the robot in multi-thread data acquisition may be corrected further.

In an example, since the control thread is not completed accurately within 0.001 s every time, there is repeated time in data. For example, due to the delay of the control thread, it takes 3*0.001 s to complete a data acquisition, so the thread for storing the data may save three sets of the same data (repeated data) at the same time. Therefore, the repeated data is removed during data processing. Based on this, in a case where differential calculation for velocity is needed, the real time difference (system time difference of industrial computer) rather than the ideal control period (0.001 s) is needed. Further, for the specific motion state data/control data, for example, the angular velocity, linear velocity and torque of the robot, the filter processing is further needed so as to reduce the error in the data acquisition process.

In another example, in a case where the data may be acquired for multiple times, only the motion state data in a case where the pitch angle of the base part of the robot is within a predetermined range may be acquired in the motion process of the robot. For example, in this case, the data of a linear portion (the inclination angle is within +/−15 degrees) may be spliced after multiple data acquisitions. For example, the motion state data and the control data in response to the inclination angle within +/−15 degrees may be spliced after completing the integrals $\Delta xx$, $\Sigma xx$, and $\Sigma xu$. The following shows an exemplary experiment of calculating the controller corresponding to the dynamic characteristics of the robot by using a data iteration scheme. As shown in FIG. 10, the minimal height of the robot is 0.33 m. Moreover, the motion instruction is directly given manually by the remote controller to indicate the torque of the driving wheel. In the experiment, with the increase of the torque of the driving wheel, the robot is started from an initial state (shown in a state A), and moves with the driving wheel (shown in a state B and a state C) and finally falls (state D). Since the robot finally loses the balance, the remote controller in this case is not the quasi-balanced controller.

Figure 11:
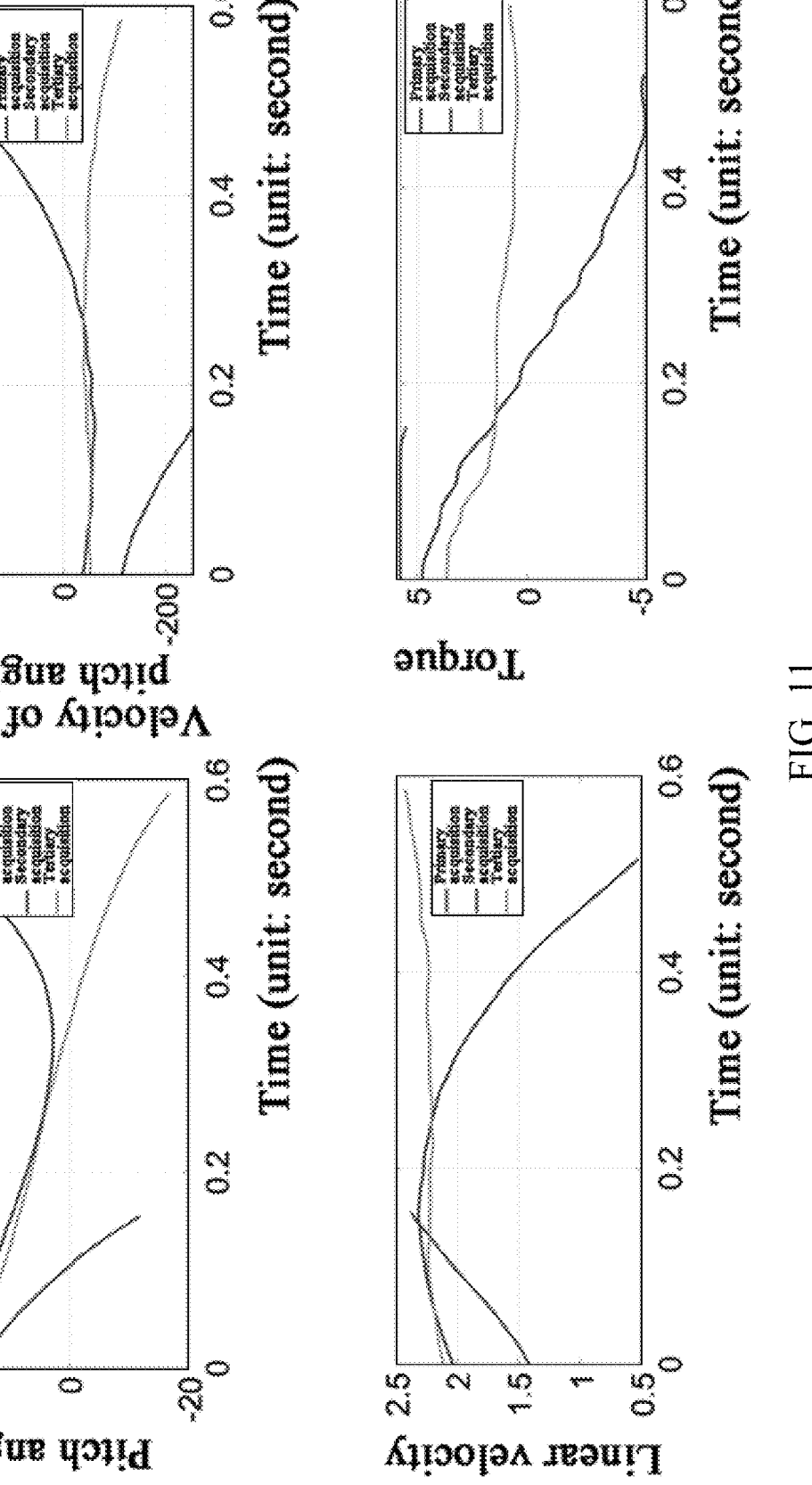
FIG. 11 is a curve chart of acquiring motion state data and control data of a robot according to an embodiment of this disclosure.

The same process may be repeated for three times. The data acquired in three times is drawn in FIG. 11, where the torque is a total torque of the two driving wheel motors. In particular, in a case where the system is assumed as being linear, the data approximate to a linear zone of a simplified model is used, that is, the inclination angle is greater than −20 degrees and less than 20 degrees. As shown in FIG. 11, the duration of the three data acquisition processes is 0.515 seconds, 0.155 seconds and 0.586 seconds respectively, which is 1.256 seconds in total. Any non-professional can easily collect these short-term data by manually inputting the torque through the remote controller. In addition, since the data iteration scheme may be performed off-line, various parameters may be easily regulated to enable the iteration item to converge.

For the motion state data and the control data in FIG. 11, by setting Q=diag[20000,8000,3000], R=20 and $t_{i+1}-t_i$=0.1s, iteration schematic diagrams of P and K shown in FIG. 12 may be obtained. According to the test performed by the experimenter, after 3275 value iterations, the converged K=[−81.99, −34.96, −16.38] may be obtained.

Based on K=[−81.99, −34.96, −16.38], the controller corresponding to the dynamic characteristics of the robot is constructed. The controller is used for controlling the real robot to travel in a path shown in FIG. 13, the test data of the inclination angle (generally within +/−2 degrees), linear velocity and yawing velocity shown in FIG. 14 is obtained, so that the controller with sufficiently high robustness and stability can be obtained by adopting the data iteration scheme.

A person skilled in the art may understand that the controller with the control information may also be used for controlling other motions. This disclosure is not limited to this. In addition, it is tested that the robustness of the controller with the control information can be far higher than the PID controller, that is, in a case where the robot 100 suffers external disturbance, the robot controlled by the controller with the control information can be restored to balance quickly.

Thus, according to the embodiment of this disclosure, based on the reinforcement learning and the ADP technology in artificial intelligence, by using the value iteration scheme, the optimal balance control problem of the robot without knowing the dynamic characteristics of the robot can be addressed. According to an embodiment of this disclosure, during the construction of the controller, the wheel-legged robot under the control of the non-optimal controller/any controller may only need to travel for a period of time or trajectory, and the motion state data and the control data corresponding to the time of period or the trajectory are collected as training data. Thus, the quantity of the training data in the embodiment of this disclosure is far less than the data volume required in the traditional reinforcement learning algorithm. Further, the trained controller in the embodiments of this disclosure gradually converges to the controller corresponding to the optimal solution of the linear quadratic regulation problem with the increase of the learning step length, so that the stability of the closed-loop system may be improved and/or ensured, and the training process is greatly simplified. Moreover, the training data does not need to be limited additionally, so that a design process of the controller of the wheel-legged robot is simplified.

This disclosure further provides a robot control apparatus. The robot includes a wheel-legged part, and the wheel-legged part includes a driving wheel and a plurality of joints. The apparatus includes: an adaptive processing module, a first control information determination module, a second control information determination module, and a control torque determination module.

The adaptive processing module is configured to adaptively determine control information for controlling rotation of the driving wheel based on motion information of the robot in a motion process.

The first control information determination module is configured to determine first control information for controlling the plurality of joints based on the control information, the first control information being used for keeping the robot balanced.

The second control information determination module is configured to determine second control information for controlling the plurality of joints based on a target trajectory of the robot, the second control information being used for making the robot move along the target trajectory.

The control torque determination module is configured to determine a control torque respectively for controlling each joint in the plurality of joints based on a motion constraint condition of the robot, the first control information, and the second control information.

In some embodiments, the adaptive processing module is further configured to determine the control information for controlling the rotation of the driving wheel in a policy iteration method based on the motion information of the robot in motion process.

In some embodiments, the adaptive processing module is further configured to determine the control information for the controlling rotation of the driving wheel in a value iteration method based on the motion information of the robot in the motion process.

In an embodiment, the control torque determination module is configured $t_o$:

determine at least one candidate control torque combination corresponding to a plurality of joints of the robot based on the first control information and the second control information, the at least one candidate control torque combination satisfying the motion constraint condition of the robot;

determine a value corresponding to a dynamic whole-body dynamic target function of the robot based on the at least one candidate control torque combination;

select the candidate control torque combination enabling the dynamic whole-body dynamic target function to reach an extreme value from the at least one candidate control torque combination; and take each candidate control torque in the candidate control torque combination as the control torque respectively for controlling each joint in the plurality of joints.

In some embodiments, parameters of the dynamic whole-body dynamic target function include at least one of the following items:

a vector formed by combining sets of the acceleration of the target trajectory set for each joint;

a vector formed by combining sets of the acceleration of each joint in the motion process;

a vector formed by combining sets of torques of the target trajectory set for each joint;

a generalized force provided by the ground at a contact point where the robot contacts the ground; and a closed-loop force in the wheel-legged part in a case where the robot has a closed-loop linkage mechanism.

In some embodiments, the motion constraint condition of the robot includes at least one of the following items: a dynamic constraint condition, a closed-loop linkage constraint condition, a nonholonomic constraint condition, and a friction constraint condition.

In some embodiments, at least some of the dynamic constraint conditions are determined based on the dynamic model of the robot. The dynamic model is used for representing a change relationship between each joint and a centroid angle, an angular velocity, an angular acceleration, a joint torque, and an external contact force in the motion process of the robot.

In some embodiments, one end of the wheel-legged part facing the driving wheel is connected to the base part, and the first control information determination module is further configured to determine influencing data of a rotational velocity of the driving wheel on the posture and velocity of the base part based on the control information and the motion information of the robot; and determine an expected acceleration of the base part based on the influencing data, and determine the first control information for controlling the plurality of joints based on the expected acceleration.

In some embodiments, the robot further includes a tail part;

the first control information is the output of the wheel balance control task;

and the second control information is the output of any one or more of the wheel motion and rotational control task, base part posture control task and tail part control task.

In some embodiments, the wheel balance control task includes the expected acceleration of the base part calculated by a proportional differential controller;

and the control parameters of the proportional differential controller are obtained based on the input reference for the posture and the input reference for the velocity.

In some embodiments, the input reference for the posture includes: a distance from the gravity center of the robot to the center of a connecting line of the driving wheels projected on the ground.

The input reference for the velocity includes: a differential velocity obtained based on the distance from the gravity center of the robot to the center of the connecting line of the driving wheels projected on the ground and the linear velocity of the wheel.

In some embodiments, the input reference for the posture includes: an equivalent inclination angle of the base part, the equivalent inclination angle being obtained by calculating the distance from the gravity center of the robot to the center of the connecting line of the driving wheels projected on the ground and the height of the mass center; and the input reference for the velocity includes: an equivalent inclination angle acceleration, the equivalent inclination angle acceleration being obtained by calculating the differential velocity obtained based on the distance from the gravity center of the robot to the center of the connecting line of the driving wheels projected on the ground and the height of the mass center.

In some embodiments, this disclosure further provides a computer-readable storage medium (such as a non-transitory computer-readable storage medium), which stores a computer-readable instruction. When executed by one or more processors, the computer-readable instruction implements the steps of the method as described in any one of the above embodiments.

A computer program product is provided, which includes a computer-readable instruction, the computer-readable instruction, when executed by one or more processors, implementing the steps of the method as described in any one of the above embodiments.

According to the practical need, the robot, for example, may further include a bus, a memory, a sensor assembly, a communication module and an input/output apparatus. The embodiments of this disclosure are not limited by specific constituent components of the robot.

The bus may be a circuit connecting all components of the robot and transmitting communication information (such as control information or data) between the components.

The sensor assembly may be configured to sense a physical world, for example, may include a camera, an infrared sensor, an ultrasonic sensor, and the like. In addition, the sensor assembly may further include an apparatus for measuring a current running and motion state of the robot, such as a hall sensor, a laser position sensor, or a strain sensor, and the like.

The communication module, for example, may be connected with a network in a wired or wireless manner, so as to communicate with the physical world (such as a server). The communication module may be wireless, and may include a wireless interface, such as IEEE 802.11, Bluetooth, a wireless local area network (WLAN) transceiver, or a radio interface for accessing a cellular phone network (such as a transceiver/antenna accessing CDMA, GSM, UMTS or other mobile communication networks). In another example, the communication module may be wired, and may include interfaces such as Ethernet, USB, or IEEE 1394.

The input/output apparatus may, for example, transmit an instruction or data inputted by a user or any other peripheral device to one or more other components, or may output the instruction or data received from one or more other components of the robot to the user or other peripheral devices.

A plurality of robots may constitute a robot system so as to collaboratively complete a task. The plurality of robots are in communication connection to the server, and receive a robot collaboration instruction from the server.

The program portion in the technology may be regarded as a "product" in a form of executable code and/or related data, which is participated in or realized by computer-readable media. Tangible and permanent storage media may include any internal memory or memory used by computers, processors, or similar devices or related modules. For example, various semiconductor memories, tape drives, disk drives or any similar devices can provide storage functions for software.

All or some of the software may be communicated by the network, such as the Internet or other communication networks. The communication may load the software from one computer device or processor to another. Therefore, another medium capable of transferring software elements may also be used as physical connection between local devices, for example optical waves, radio waves, electromagnetic waves and the like spread through cables, optical cables or air. Physical media used for carrier waves, such as cables, wireless connections or optical cables and other similar devices, may also be considered as media for carrying software. Unless the usage here is limited to tangible "storage" media, other terms referring to computer or machine "readable media" refer to media that participate in the execution of any instructions by a processor.

This disclosure utilizes a specific term to describe the embodiments of this disclosure. For example, "first/second embodiment", "an embodiment" and/or "some embodiments" intend to refer a certain feature, structure or characteristic point related to at least one embodiment. Therefore, two or more references to "an embodiment" or "one embodiment" or "an alternative embodiment" in different places in this specification do not necessarily refer to the same embodiment. In addition, some features, structures or characteristic points in one or more embodiments of this disclosure may be combined properly.

In addition, a person skilled in the art may understand that various aspects of this disclosure may be illustrated and described by several patentable categories or situations, including any new and useful process, machine, product or substance combination, or any new and useful improvement thereon. Various aspects of this disclosure may be entirely executed by hardware, may be entirely executed by software (including firmware, resident software, microcode, and the like), or may be executed by a combination of hardware and software. The foregoing hardware or software may be referred to as "data block", "module", "engine", "unit", "component" or "system". In addition, various aspects of this disclosure may be embodied as computer products located in one or more computer-readable media, the product including a computer-readable program code.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Unless otherwise defined, all terms (including technical and scientific terms) used herein have the same meaning as commonly understood by one of ordinary skill in the art to which this disclosure belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

Although several exemplary embodiments of this disclosure are described, other embodiments are within the scope of this disclosure. It is to be understood that, the above description of this disclosure should not be considered as being limited to the specific embodiments of this disclosure, and modifications to the embodiments of this disclosure and other embodiments are intended to be included in the scope of the disclosure.

What is claimed is:

1. A method of controlling a robot, the method comprising:

adaptively determining first control information for controlling rotation of a driving wheel of a wheel-legged part of the robot based on motion information of the robot that is generated while the robot is in motion;

determining influencing data of a rotational velocity of the driving wheel on a posture of a base part of the robot and a velocity of the base part based on the first control information and the motion information of the robot;

determining an expected acceleration of the base part based on the influencing data;

determining second control information for controlling a plurality of joints of the wheel-legged part of the robot based on the expected acceleration, the second control information being configured to adjust a center of gravity of the robot such that the plurality of joints is controlled based on the second control information to balance the robot;

determining third control information for controlling the plurality of joints based on a target trajectory of the robot, the third control information being configured to adjust the posture of the base part of the robot such that a potential energy associated with the robot is converted into a dynamic energy of the robot to assist movement of the robot along the target trajectory;

determining a respective control torque for controlling each joint in the plurality of joints based on motion constraint condition information of the robot, the second control information, and the third control information, the motion constraint condition information of the robot including at least one of a dynamic constraint condition, a closed-loop linkage constraint condition, a nonholonomic constraint condition, or a friction constraint condition; and controlling each joint in the plurality of joints based on the control torque for the respective joint, wherein the wheel-legged part is connected to the base part of the robot.

2. The method according to claim 1, wherein the adaptively determining the first control information comprises:

determining the first control information for controlling the rotation of the driving wheel by a policy iteration method based on the motion information of the robot.

3. The method according to claim 1, wherein the adaptively determining the first control information comprises:

determining the first control information for controlling the rotation of the driving wheel by a value iteration method based on the motion information of the robot.

4. The method according to claim 1, wherein the determining the respective control torque for controlling each joint in the plurality of joints comprises:

determining at least one candidate control torque combination corresponding to the plurality of joints of the robot based on the second control information and the third control information;

determining a value corresponding to a dynamic whole-body dynamic target function of the robot based on each of the at least one candidate control torque combination;

selecting a candidate control torque combination that enables the dynamic whole-body dynamic target function to reach an extreme value from the at least one candidate control torque combination; and determining the respective control torques based on the selected candidate control torque combination.

5. The method according to claim 4, wherein parameters of the dynamic whole-body dynamic target function comprise at least one of:

a vector formed by combining sets of acceleration of the target trajectory set for each joint;

a vector formed by combining sets of acceleration of each joint while the robot is in motion;

a vector formed by combining sets of torques of the target trajectory set for each joint;

a generalized force provided by a ground at a contact point where the robot contacts the ground; or a closed-loop force in the wheel-legged part of the robot including a closed-loop linkage mechanism.

6. The method according to claim 1, wherein the motion constraint condition information includes at least the dynamic constraint condition that is determined based on a dynamic model of the robot, the dynamic model representing a change relationship between each joint and at least one of a centroid angle, an angular velocity, an angular acceleration, a joint torque, or an external contact force while the robot is in motion.

7. The method according to claim 1, wherein the robot includes a tail part;

the second control information is an output of a wheel balance control task; and the third control information is an output of at least one of a wheel motion and rotational control task, a base part posture control task, or a tail part control task.

8. The method according to claim 7, wherein the expected acceleration of the base part is calculated by a proportional differential controller, and control parameters of the proportional differential controller are obtained based on an input reference for the posture and an input reference for the velocity.

9. The method according to claim 8, wherein the input reference for the posture includes a distance from the center of gravity of the robot to a center of a connecting line of the driving wheel projected on a ground, and the input reference for the velocity includes a differential velocity obtained by performing a differential calculation on the distance from the center of gravity of the robot to the center of the connecting line of the driving wheel projected on the ground and a linear velocity of the driving wheel.

10. The method according to claim 8, wherein the input reference for the posture includes an equivalent inclination angle of the base part, the equivalent inclination angle being obtained by calculating a distance from the center of gravity of the robot to a center of a connecting line of the driving wheel projected on a ground and a height of a center of mass of the robot, and the input reference for the velocity includes an equivalent inclination angle acceleration, the equivalent inclination angle acceleration being obtained by a ratio of (i) a differential velocity obtained based on the distance from the center of gravity of the robot to the center of the connecting line of the driving wheel projected on the ground and (ii) the height of the center of mass of the robot.

11. The method according to claim 1, wherein the first control information, the second control information, the third control information, and the respective control torque for controlling each joint in the plurality of joints are determined by a first controller, and the method further comprises:

controlling the robot to move based on the respective control torque for controlling each joint in the plurality of joints;

acquiring motion state data and control data of the robot while the robot is controlled to move based on the respective control torque for controlling each joint;

updating a linear balance parameter matrix by a policy iteration method according to the motion state data and the control data; and building a second controller corresponding to dynamic characteristics of the robot based on the updated linear balance parameter matrix.

12. The method according to claim 1, wherein the first control information, the second control information, the third control information, and the respective control torque for controlling each joint in the plurality of joints are determined by a first controller, and the method further comprises:

acquiring initial motion state data and initial control data of the robot in an initial motion process;

calculating a linear balance parameter matrix by a value iteration method according to the initial motion state data and the initial control data; and building the first controller corresponding to dynamic characteristics of the robot based on the linear balance parameter matrix.

13. A robot control apparatus, comprising:

processing circuitry configured to:

adaptively determine first control information for controlling rotation of a driving wheel of a wheel-legged part of a robot based on motion information of the robot that is generated while the robot is in motion;

determine influencing data of a rotational velocity of the driving wheel on a posture of a base part of the robot and a velocity of the base part based on the first control information and the motion information of the robot;

determine an expected acceleration of the base part based on the influencing data;

determine second control information for controlling a plurality of joints of the wheel-legged part of the robot based on the expected acceleration, the second control information being configured to adjust a center of gravity of the robot such that the plurality of joints is controlled based on the second control information to balance the robot;

determine third control information for controlling the plurality of joints based on a target trajectory of the robot, the third control information being configured to adjust the posture of the base part of the robot such that a potential energy associated with the robot is converted into a dynamic energy of the robot to assist movement of the robot along the target trajectory;

determine a respective control torque for controlling each joint in the plurality of joints based on motion constraint condition information of the robot, the second control information, and the third control information, the motion constraint condition information of the robot including at least one of a dynamic constraint condition, a closed-loop linkage constraint condition, a nonholonomic constraint condition, or a friction constraint condition; and control each joint in the plurality of joints based on the control torque of the respective joint, wherein the wheel-legged part is connected to the base part of the robot.

14. The robot control apparatus according to claim 13, wherein the processing circuitry is configured to determine the first control information for controlling the rotation of the driving wheel using a policy iteration method based on the motion information of the robot.

15. The robot control apparatus according to claim 13, wherein the processing circuitry is configured to determine the first control information for controlling the rotation of the driving wheel using a value iteration method based on the motion information of the robot.

16. A robot, comprising:

the robot control apparatus according to claim 13;

the wheel-legged part; and the base part connected to the wheel-legged part, the wheel-legged part and the base part including the plurality of joints.

17. A non-transitory computer-readable storage medium, storing instructions which when executed by a processor cause the processor to perform:

adaptively determining first control information for controlling rotation of a driving wheel of a wheel-legged part of a robot based on motion information of the robot that is generated while the robot is in motion;

determining influencing data of a rotational velocity of the driving wheel on a posture of a base part of the robot and a velocity of the base part based on the first control information and the motion information of the robot;

determining an expected acceleration of the base part based on the influencing data;

determining second control information for controlling a plurality of joints of the wheel-legged part of the robot based on the expected acceleration, the second control information being configured to adjust a center of gravity of the robot such that the plurality of joints is controlled based on the second control information to balance the robot;

determining third control information for controlling the plurality of joints based on a target trajectory of the robot, the third control information being configured to adjust the posture of the base part of the robot such that a potential energy associated with the robot is converted into a dynamic energy of the robot to assist movement of the robot along the target trajectory;

determining a respective control torque for controlling each joint in the plurality of joints based on motion constraint condition information of the robot, the second control information, and the third control information, the motion constraint condition information of the robot including at least one of a dynamic constraint condition, a closed-loop linkage constraint condition, a 5 nonholonomic constraint condition, or a friction constraint condition; and controlling each joint in the plurality of joints based on the control torque of the respective joint, wherein the wheel-legged part is connected to the base part of the 10 robot.

* * * * *